US011174347B2

(12) United States Patent
Sybert et al.

(10) Patent No.: US 11,174,347 B2
(45) Date of Patent: Nov. 16, 2021

(54) PHTHALIMIDINE COPOLYCARBONATE OPTICAL ARTICLES, ARTICLES FORMED THEREFROM, AND METHODS OF MANUFACTURE

(71) Applicant: SABIC GLOBAL TECHNOLOGIES B.V., Bergen op Zoom (NL)

(72) Inventors: Paul Dean Sybert, Evansville, IN (US); Wei Zhao, Evansville, IN (US); Mark Adrianus Johannes van der Mee, Breda (NL); Shubashree Swaminathan, Bangalore (IN); Jaykisor Pal, Bangalore (IN); Jordi Calveras, Evansville, IN (US); Vaidyanath Ramakrishnan, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/758,953

(22) PCT Filed: Nov. 1, 2018

(86) PCT No.: PCT/US2018/058638
§ 371 (c)(1),
(2) Date: Apr. 24, 2020

(87) PCT Pub. No.: WO2019/089887
PCT Pub. Date: May 9, 2019

(65) Prior Publication Data
US 2020/0339745 A1  Oct. 29, 2020

(30) Foreign Application Priority Data
Nov. 1, 2017 (IN) .............................. 201711038834

(51) Int. Cl.
*C08G 64/12* (2006.01)
*C08G 64/30* (2006.01)
*C08L 69/00* (2006.01)
*G02B 1/04* (2006.01)

(52) U.S. Cl.
CPC ........... *C08G 64/12* (2013.01); *C08G 64/307* (2013.01); *C08L 69/00* (2013.01); *G02B 1/043* (2013.01)

(58) Field of Classification Search
None
See application file for complete search history.

(56) References Cited

U.S. PATENT DOCUMENTS

| 5,344,910 | A | 9/1994 | Sybert |
| 5,502,153 | A | 3/1996 | Sakashita et al. |
| 5,717,057 | A | 2/1998 | Sakashita et al. |
| 6,635,710 | B2 | 10/2003 | Kono et al. |
| 7,491,788 | B1 | 2/2009 | Leenders et al. |
| 7,968,671 | B2 | 6/2011 | Heuer et al. |
| 8,064,140 | B2 | 11/2011 | Hoeks et al. |
| 8,871,865 | B2 | 10/2014 | Jansen et al. |
| 9,255,200 | B2 | 2/2016 | Kulkarni et al. |
| 9,287,471 | B2 | 3/2016 | De Brouwer et al. |
| 9,676,716 | B2 | 6/2017 | Heuer et al. |
| 9,868,817 | B2 | 1/2018 | Kohler et al. |
| 2005/0245720 | A1* | 11/2005 | Yang ................. G02B 1/041 528/86 |
| 2009/0088504 | A1 | 4/2009 | Chatterjee et al. |
| 2012/0157653 | A1 | 6/2012 | Konig et al. |
| 2013/0035441 | A1 | 2/2013 | De Brouwer et al. |
| 2014/0063831 | A1 | 3/2014 | Lowery et al. |
| 2014/0234629 | A1 | 8/2014 | Sun et al. |
| 2014/0295363 | A1 | 10/2014 | Sun et al. |
| 2016/0237210 | A1 | 8/2016 | Mahood et al. |
| 2017/0022359 | A1 | 1/2017 | Farrell et al. |
| 2019/0023897 | A1* | 1/2019 | Sun ....................... C08K 3/32 |
| 2019/0300701 | A1* | 10/2019 | Van Der Mee ............ C08J 7/05 |
| 2020/0172664 | A1 | 6/2020 | Sybert et al. |
| 2020/0172665 | A1 | 6/2020 | Sybert et al. |
| 2020/0190003 | A1 | 6/2020 | Uchiyama et al. |

FOREIGN PATENT DOCUMENTS

| EP | 0046558 | A2 | 3/1985 |
| JP | 2005068216 | * | 3/2005 |
| JP | 2006028391 | A1 | 2/2006 |
| WO | 2013027165 | A1 | 2/2013 |
| WO | 2013175448 | A1 | 11/2013 |
| WO | 2014072923 | A1 | 5/2014 |
| WO | 2016079706 | A1 | 5/2016 |
| WO | 2017037637 | A1 | 3/2017 |
| WO | 2018020425 | A1 | 2/2018 |

OTHER PUBLICATIONS

International Search Report for International Application No. PCT/US2018/058638, International Filing Date Nov. 1, 2018, dated Mar. 1, 2019, 5 pages.
Nowakowska et al.; "Studies of Some Impurities in Commercial Bisphenol-A"; Polish Journal of Applied Chemistry; vol. XL, No. 3; 1996; pp. 247-254.
Written Opinion for International Application No. PCT/US2018/058638, International Filing Date Nov. 1, 2018, dated Mar. 1, 2019, 7 pages.
Das et al. "Computational linear rheology of general branch-on-branch polymers", The Society of Rehology, Inc. J. Rheol. 50(2), 207-234, (2006).
Camarda et al. "Optimization in Polymer Design Using Connectivity Indices" Ind. Eng. Chern. Res. 1999, 38, 1884-1892.

(Continued)

*Primary Examiner* — David J Buttner
(74) *Attorney, Agent, or Firm* — Cantor Colburn LLP

(57) ABSTRACT

A copolycarbonate optical article comprises a polycarbonate composition including: a copolycarbonate having: 2 to 60 mol % of phthalimidine carbonate units, 2 to 90 mol % of high heat carbonate units, and optionally 2 to 60 mol % of bisphenol A carbonate units. The copolycarbonate has less than 100 ppm of each of phthalimidine, high heat bisphenol, and bisphenol A monomers, and less than 5 ppm of various ions, and is prepared from monomers each having a purity of at least 99.6%. The polycarbonate composition has a glass transition temperature of 200° C. to and a yellowness index of less than 30.

20 Claims, 1 Drawing Sheet

(56) References Cited

OTHER PUBLICATIONS

Mayo et al. "Dreiding: A Generic Force Field of Molecular Simulations", J. Phsy. Chem. 1990,94, 8897-8909.

van Breemen et al. "Extending the EGP constitutive model for polymer glasses to multiple relaxation times", Journal of the Mechanics and Physics of Solids 59 (2011) 2191-2207.

van Ruymbeke et al. "Prediction of linear viscoelastic properties for polydisperse mixtures of entangled star and linear polymers: Modified tube-based model and comparison with experimental results" J. Non-Newtonian Fluid Mech. 128 (2005) 7-22.

Xu et al. "Prediction of refractive indices of linear polymers by a four-descriptor QSPR model", Polymer 45 (2004) 8651-8659.

\* cited by examiner

PHTHALIMIDINE COPOLYCARBONATE OPTICAL ARTICLES, ARTICLES FORMED THEREFROM, AND METHODS OF MANUFACTURE

CROSS REFERENCE TO RELATED APPLICATIONS

This application is a National Stage application of PCT/US2018/058638, filed Nov. 1, 2018, which claims the benefit of India Application No. 201711038834, filed Nov. 1, 2017, both of which are incorporated by reference in their entirety herein.

BACKGROUND

This disclosure generally relates to polycarbonate optical articles, and more particularly, to copolycarbonate optical lenses, methods of manufacture, and uses thereof.

Polycarbonates are useful in the manufacture of articles and components for a wide range of applications, from automotive parts to electronic appliances. Because of their broad use, particularly in lenses that are used or assembled in a high-temperature environment, it is desirable to provide polycarbonates that have high transmission and low color as well as the ability to withstand elevated temperatures without deformation or discoloration. Additionally, it may be desirable be able to adjust the refractive index of the material depending on the application. Lastly, depending on the application, there may be a need for higher levels of ultraviolet light (UV) stability.

There accordingly remains a need for polycarbonates having improved balance of high heat performance and optical properties. It would be a further advantage if the polycarbonates had improved UV and hydrolytic stability.

SUMMARY

A copolycarbonate optical article comprises a polycarbonate composition comprising: a copolycarbonate comprising: 2 to 60 mol % of phthalimidine carbonate units derived from a phthalimidine monomer, 2 to 90 mol % of high heat carbonate units derived from a high heat bisphenol monomer, and optionally 2 to 60 mol % of bisphenol A carbonate units derived from a bisphenol A monomer, each based on the sum of the moles of the phthalimidine carbonate units, the high heat carbonate units, and the bisphenol A carbonate units, wherein the copolycarbonate comprises less than 100 parts per million of each of the phthalimidine monomer, the high heat bisphenol monomer, and the bisphenol A monomer, and less than 5 ppm and preferable less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and the copolycarbonate is prepared from the phthalimidine monomer, the high heat bisphenol monomer, and optionally the bisphenol A monomer each having a purity of at least 99.6%, or at least 99.7% as determined by high performance liquid chromatography; and wherein the polycarbonate composition has a glass transition temperature of 200° C. to 260° C. determined by DSC as per ASTM D3418 with a 20° C./min heating rate and a yellowness index of less than 30, preferably less than 20, or less than 10 measured according to ASTM D1925 on a plaque of 3.2 mm thickness molded at a temperature of 350° C. for a residence time of 2 minutes.

The above described and other features are exemplified by the following detailed description, examples, and claims.

BRIEF DESCRIPTION OF THE DRAWINGS

The following figures are exemplary and not limiting, and in which.

DETAILED DESCRIPTION

Figure 1:
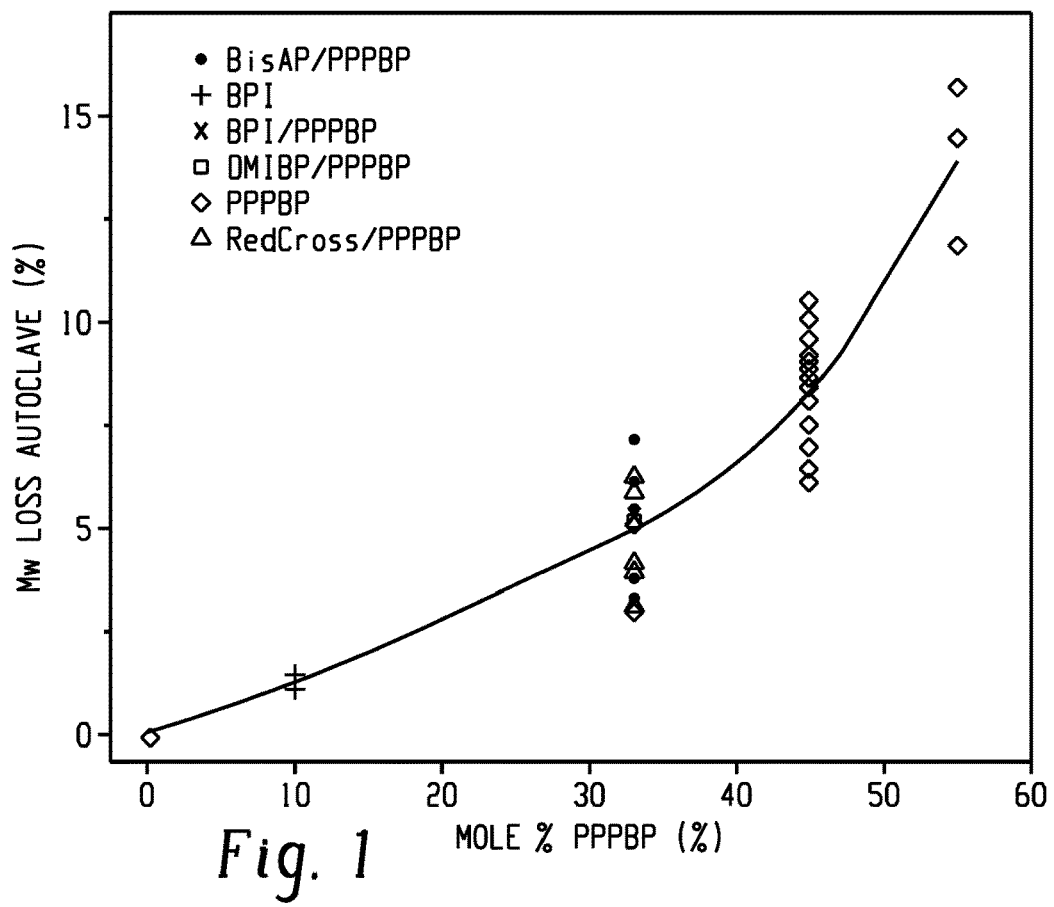
FIG. 1 shows the effect of the PPPBP content on the Mw loss after autoclaving.

It has now been found that a copolycarbonate optical articles having desirable high heat performance can be formed from a polycarbonate composition comprising phthalimidine copolycarbonates derived from 2-phenyl-3,3'-bis(4-hydroxy phenyl)phthalimidine or 2-methyl-3,3'-bis(4-hydroxy phenyl)phthalimidine, another high heat monomer, and optionally BPA. The copolycarbonate optical articles can also have enhanced optical properties. Moreover, the phthalimidine copolycarbonates have improved hydrolytic stability, color and UV stability compared to copolycarbonates consisting of BPA carbonate units and phthalimidine carbonate units, which allows the optical articles to be used in high humidity applications.

As used herein, phthalimidine copolycarbonates are high heat copolycarbonates having a glass transition temperature of 200° C. or higher, and comprising phthalimidine carbonate units and high heat carbonate units derived from a high heat bisphenol monomer.

The phthalimidine carbonate units are of formula (1)

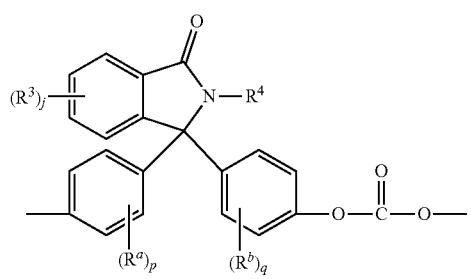

wherein $R^a$ and $R^b$ are each independently a $C_{1-12}$ alkyl, $C_{1-12}$ alkenyl, $C_{3-8}$ cycloalkyl, or $C_{1-12}$ alkoxy, preferably a $C_{1-3}$ alkyl, each $R^3$ is independently a $C_{1-6}$ alkyl, $R^4$ is hydrogen, $C_{1-6}$ or $C_{2-6}$ alkyl or phenyl optionally substituted with 1 to 5 $C_{1-6}$ alkyl groups, and p and q are each independently 0 to 4, or 0 to 1. In an aspect in (1), $R^a$ and $R^b$ are each independently $C_{1-3}$ alkyl, each $R^3$ is independently $C_{1-4}$ alkyl, $R^4$ is hydrogen or phenyl optionally substituted with up to five $C_{1-6}$ alkyls, and p and q are each independently 0 or 1.

For example, phthalimidine carbonate units can be of formula (1a)

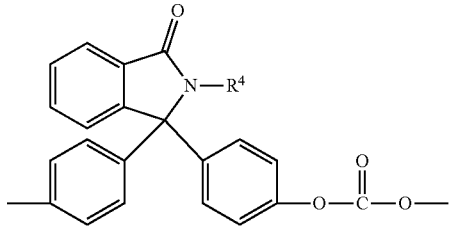

(1a)

wherein $R^5$ is hydrogen, phenyl optionally substituted with up to five $C_{1-6}$ alkyl groups, or $C_{1-4}$ alkyl, such as methyl or $C_{2-4}$ alkyl. In an aspect, $R^5$ is methyl or phenyl, preferably phenyl. Carbonate units (1a) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one or N-phenyl phenolphthalein or "PPPBP"). In another aspect, where higher levels of UV stability are required, $R^5$ is preferably methyl. Carbonate units (1a) wherein $R^5$ is methyl can be derived from 2-methyl-3,3'-bis(4-hydroxy phenyl)phthalimidine (also known as 3,3-bis(4-hydroxyphenyl)-2-methylisoindolin-1-one or N-methyl phenolphthalein or "MPP").

As used herein, "high heat bisphenol monomer" (also referred as "second high heat monomer") means a bisphenol other than PPPBP or MPP that can be used to make a polycarbonate homopolymer having a glass transition temperature of 175 to 330° C. determined by differential scanning calorimetry (DSC) as per ASTM D3418 with a 20° C./min heating rate. High heat carbonate units formed from the high heat bisphenol monomers can have the formula

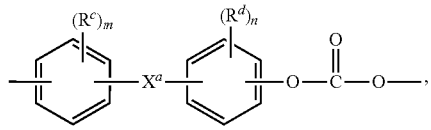

(3)

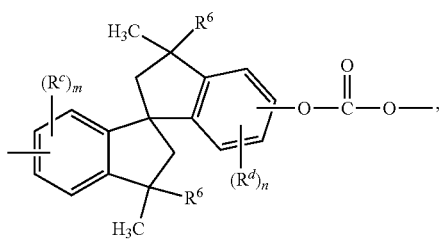

(4)

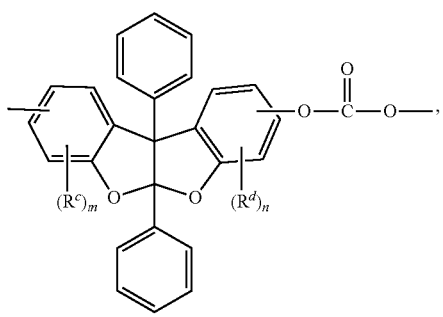

(5)

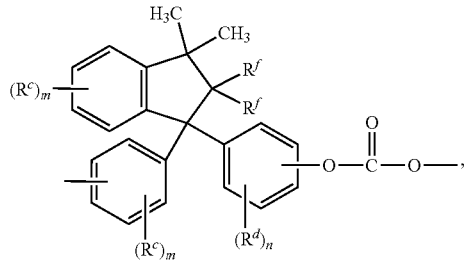

(6)

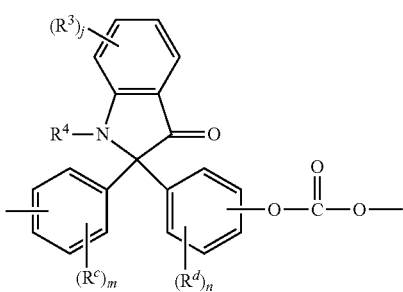

(7)

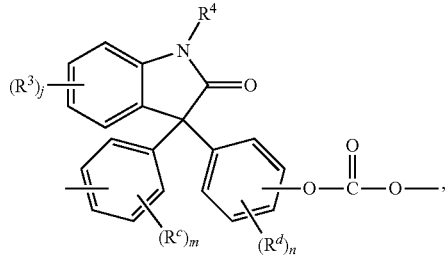

(8)

or a combination thereof, wherein $R^c$ and $R^d$ are each independently $C_{1-12}$ alkyl, $C_{2-12}$ alkenyl, $C_{3-8}$ cycloalkyl, or $C_{1-12}$ alkoxy, each $R^f$ is hydrogen or both $R^f$ together are a carbonyl group, each $R^3$ is independently $C_{1-6}$ alkyl, $R^4$ is hydrogen, $C_{1-6}$ alkyl, or phenyl optionally substituted with 1 to 5 $C_{1-6}$ alkyl groups, each $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, —$C(R^h)(R^g)$— wherein $R^h$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -$(Q^1)_x$-G-$(Q^2)_y$- wherein $Q^1$ and $Q^2$ are each independently a $C_{1-3}$ alkylene, G is a $C_{3-10}$ cycloalkylene, x is 0 or 1, and y is 1, and j, m and n are each independently 0 to 4, or 0 or 1.

Preferably in formulas (4)-(8), $R^3$, $R^6$, $R^c$ and $R^d$ are each independently a $C_{1-4}$ alkyl or $C_{1-2}$ alkyl, $R^4$ is methyl or phenyl, and j, m and n are each independently 0 or 1.

Preferably in formula (3), $R^c$ and $R^d$ are each independently a $C_{1-4}$ alkyl, $X^a$ is a $C_{6-12}$ polycyclic aryl, $C_{6-15}$ mono- or polycycloalkylene, $C_{6-15}$ mono- or polycycloalkylidene, -$(Q^1)_x$-G-$(Q^2)_y$- group wherein $Q^1$ and $Q^2$ are each independently a $C_{1-3}$ alkylene, G is a $C_{6-10}$ cycloalkylene, x is 0, and y is 1, or, —$C(R^h)(R^g)$— wherein $R^h$ is hydrogen, $C_{1-12}$ alkyl, or $C_{6-12}$ aryl and $R^g$ is $C_{6-10}$ alkyl, $C_{6-8}$ cycloalkyl; and m and n are each independently 0 or 1. In an aspect in formula (3), $R^c$ and $R^d$ are each independently a $C_{1-2}$ alkyl, $X^a$ is a $C_{6-12}$ mono- or polycycloalkylene; and m and n are each independently 0 or 1. In another aspect in formula (3), $R^c$ and $R^d$ are each independently a $C_{1-2}$ alkyl, $X^a$ is a $C_{6-10}$ mono- or polycycloalkylidene; and m and n are each independently 0 or 1.

Exemplary high heat carbonate units include the following

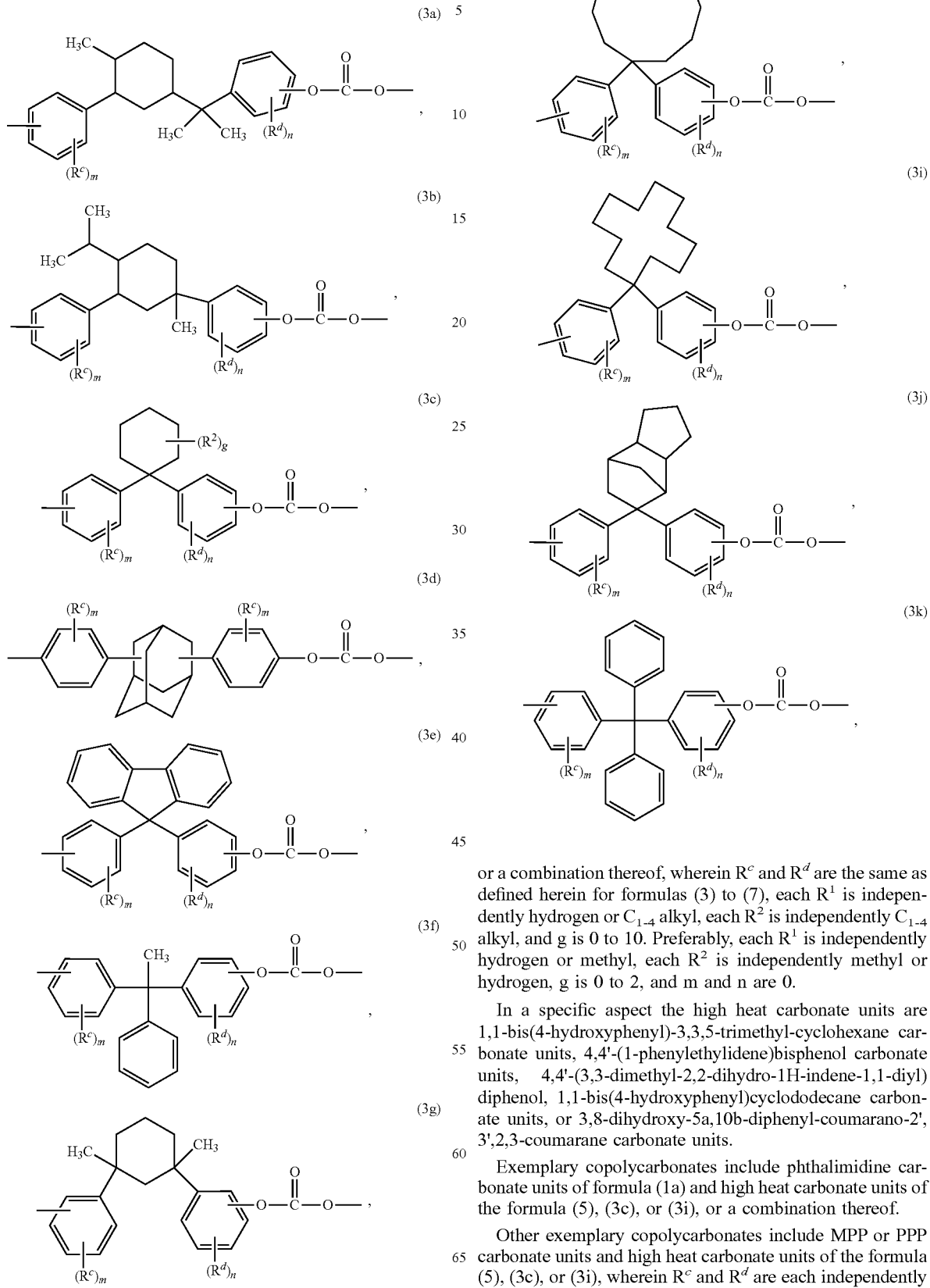

or a combination thereof, wherein $R^c$ and $R^d$ are the same as defined herein for formulas (3) to (7), each $R^1$ is independently hydrogen or $C_{1-4}$ alkyl, each $R^2$ is independently $C_{1-4}$ alkyl, and g is 0 to 10. Preferably, each $R^1$ is independently hydrogen or methyl, each $R^2$ is independently methyl or hydrogen, g is 0 to 2, and m and n are 0.

In a specific aspect the high heat carbonate units are 1,1-bis(4-hydroxyphenyl)-3,3,5-trimethyl-cyclohexane carbonate units, 4,4'-(1-phenylethylidene)bisphenol carbonate units, 4,4'-(3,3-dimethyl-2,2-dihydro-1H-indene-1,1-diyl) diphenol, 1,1-bis(4-hydroxyphenyl)cyclododecane carbonate units, or 3,8-dihydroxy-5a,10b-diphenyl-coumarano-2', 3',2,3-coumarane carbonate units.

Exemplary copolycarbonates include phthalimidine carbonate units of formula (1a) and high heat carbonate units of the formula (5), (3c), or (3i), or a combination thereof.

Other exemplary copolycarbonates include MPP or PPP carbonate units and high heat carbonate units of the formula (5), (3c), or (3i), wherein $R^c$ and $R^d$ are each independently a $C_{1-4}$ alkyl or $C_{1-2}$ alkyl, $R^1$ is independently hydrogen or $C_{1-4}$ alkyl, preferably $C_{1-2}$ alkyl, each $R^2$ is independently $C_{1-4}$ alkyl, preferably $C_{1-2}$ alkyl, g is 0 to 10 or 0 to 2, m, and n are 1 or 0.

Additional exemplary copolycarbonates include MPP or PPP carbonate units and high heat carbonate units such as 1,1-bis(4-hydroxyphenyl)-3,3,5-trimethyl-cyclohexane carbonate units, 4,4'-(1-phenylethylidene)bisphenol carbonate units, 4,4'-(3,3-dimethyl-2,2-dihydro-1H-indene-1,1-diyl)diphenol, or 1,1-bis(4-hydroxyphenyl)cyclododecane carbonate units.

The copolycarbonates, where in the phthalimidine monomer is MPP or PPP and the second high heat monomer is 1,1-bis(4-hydroxyphenyl)-3,3,5-trimethyl-cyclohexane ("BPI"), comprise 2 to 50 mole percent (mol %) of the phthalimidine carbonate units and 2 to 90 mol % of the high heat carbonate units, preferably the copolycarbonates comprise from 5 to 40 mol % of the phthalimidine carbonate units and 25 to 80 mol % of the high heat carbonate units, and more preferably the copolycarbonates comprise from 5 to 35 mol % of the phthalimidine carbonate units and 25 to 75 mol % of the high heat carbonate units, each based on the total number of carbonate units in the copolycarbonates.

In some aspects, where especially good low color, good hydro resistance, good heat resistance and good UV stability are needed, MPP may be especially useful as the phthalimidine monomer and BPI may be especially useful as the second high heat monomer. The copolymers especially useful for these applications comprise 2 to 50 mole percent (mol %) of the MPP carbonate units and 2 to 90 mol % of the BPI carbonate units, preferably the copolycarbonates comprise from 5 to 25 mol % of the MPP carbonate units and 25 to 80 mol % of the BPI carbonate units, and more preferably the copolycarbonates comprise from 5 to 15 mol % of the MPP carbonate units and 50 to 80 mol % of the BPI carbonate units, each based on the total number of carbonate units in the copolycarbonates.

In some aspects where especially good hydro stability, heat resistance and long term heat resistance to color shift are needed, 4,4'-(1-phenylethylidene)bisphenol is useful as the second high heat monomer. Especially good copolycarbonates for these applications are where the phthalimidine monomer is MPP or PPP and the second high heat monomer is 4,4'-(1-phenylethylidene)bisphenol and comprise 25 to 50 mole percent (mol %) of the phthalimidine carbonate units and 50 to 75 mol % of the high heat carbonate units, preferably the copolycarbonates comprise from 30 to 40 mol % of the phthalimidine carbonate units and 60 to 70 mol % of the high heat carbonate units, and more preferably the copolycarbonates comprise from 30 to 35 mol % of the phthalimidine carbonate units and 65 to 70 mol % of the high heat carbonate units, each based on the total number of carbonate units in the copolycarbonates.

In some aspects where especially good low color, good hydrostability, good heat resistance, and good long-term heat resistance to color shift are needed, MPP is especially useful as the phthalimidine monomer and 4,4'-(1-phenylethylidene)bisphenol is useful as the second high heat monomer. Especially good copolycarbonates for these applications are where the phthalimidine monomer is MPP and the second high heat monomer is 4,4'-(1-phenylethylidene)bisphenol and comprise 15 to 40 mole percent (mol %) of the phthalimidine carbonate units and 50 to 85 mol % of the high heat carbonate units, preferably the copolycarbonates comprise from 15 to 35 mol % of the phthalimidine carbonate units and 55 to 85 mol % of the high heat carbonate units, and more preferably the copolycarbonates comprise from 20 to 35 mol % of the phthalimidine carbonate units and 65 to 80 mol % of the high heat carbonate units, each based on the total number of carbonate units in the copolycarbonates.

In some aspects, the copolycarbonates are free of BPA carbonate units. In other aspects the copolycarbonates further include BPA carbonate units. For example, the copolycarbonate comprises, based on the sum of the moles of the phthalimidine carbonate units, the high heat carbonate units, and the BPA carbonate units: 5 to 35 mol % of the phthalimidine carbonate units; 15 to 60 mol % of the high heat carbonate units; and 30 to 50 mol % of the BPA carbonate units, or 2 to 35 mol % of the phthalimidine carbonate units, 10 to 80 mol % of the high heat carbonate units, and 10 to 60 mol % of the BPA carbonate units. Such a copolycarbonate has a glass transition temperature of 200° C. to 210° C., determined by DSC as per ASTM D3418 with a 20° C./min heating rate.

As another specific example, the copolycarbonate comprises, based on the sum of the moles of the phthalimidine carbonate units, the high heat carbonate units, and the BPA carbonate units: 5 to 40 mol % of the phthalimidine carbonate units; 30 to 78 mol % of the high heat carbonate units; and 20 to 40 mol % of the BPA carbonate units, or 5 to 45 mol % of the phthalimidine carbonate units, 10 to 75 mol % of the high heat carbonate units, and 25 to 55 mol % of the BPA carbonate units. The copolycarbonate can have a glass transition temperature of 205° C. to 215° C., determined by DSC as per ASTM D3418 with a 20° C./min heating rate.

The copolycarbonate can comprises, based on the sum of the moles of the phthalimidine carbonate units, the high heat carbonate units, and the BPA carbonate units: 5 to 40 mol % or 5 to 35 mol % of the phthalimidine carbonate units; 35 to 85 mol % or 40 to 85 mol % of the high heat carbonate units; and 12 to 30 mol % or 15 to 26 mol % of the BPA carbonate units, or 2 to 50 mol % of the phthalimidine carbonate units, 5 to 85 mol % or 35 to 85 mol % of the high heat carbonate units, and 10 to 45 mol % or 10 to 35 mol % of the BPA carbonate units. Such a copolycarbonate has a glass transition temperature of 215° C. to 225° C., determined by DSC per ASTM D3418 with a 20° C./min heating rate.

The copolycarbonate can comprise, based on the sum of the moles of the phthalimidine carbonate units, the high heat carbonate units, and the BPA carbonate units: 5 to 40 mol % or 5 to 30 mol % of the phthalimidine carbonate units; 32 to 95 mol % or 40 to 90 mol % of the high heat carbonate units; and 5 to 30 mol % or 5 to 25 mol % of the BPA carbonate units, or 2 to 55 mol % or 2 to 35 mol % of the phthalimidine carbonate units, 10 to 90 mol % or 40 to 90 mol % of the high heat carbonate units, and 5 to 40 mol % or 5 to 30 mol % of the BPA carbonate units. The copolycarbonate has a Tg of 225° C. to 235° C., determined by DSC per ASTM D3418 with a 20° C./min heating rate.

As a further example, the copolycarbonate comprises, based on the sum of the moles of the phthalimidine carbonate units, the high heat carbonate units, and the BPA carbonate units: 25 to 40 mol % or 30 to 35 mol % of the phthalimidine carbonate units; 55 to 80 mol % or 65 to 75 mol % of the high heat carbonate units; and 0 to 15 mol % or 0 mol % of the BPA carbonate units, or 25 to 55 mol % or 25 to 35 mol % of the phthalimidine carbonate units, 35 to 75 mol % or 65 to 75 mol % of the high heat carbonate units, and 0 to 15 mol % or 0 mol % of the BPA carbonate units. The copolycarbonate can have a glass transition temperature of 245° C. to 260° C., determined by DSC per ASTM D3418 with a 20° C./min heating rate.

To further enhance the optical properties of the polycarbonate compositions, the copolycarbonates are essentially free of monomers used to make the copolycarbonates, and preferably, the copolycarbonate comprises less than 100 parts per million, less than 50 parts per million, or less than 25 parts per million of each of the phthalimidine monomer, the high heat bisphenol monomer, and BPA monomer.

The copolycarbonates can be essentially free of certain ions or low molecular weight molecules (less than 150 Dalton (Da)) present in the starting materials or arising from manufacture of the copolymers. In another aspect, the high heat copolycarbonates comprise less than 5 ppm, or less than 2 ppm of each chloride, sodium, calcium, iron, nickel, copper, and zinc ions as residual impurities.

In an aspect, which is preferred, the copolycarbonates have a very low residual impurity content, in particular less than 2 ppm of each of triethyl amine, calcium ions, magnesium ions, potassium ions, iron ions, and chloride ions. In another aspect, the copolycarbonates have a low residual impurity content, in particular less than 5 ppm by weight, or less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. The foregoing residual impurities can exist in the copolycarbonates or polycarbonate compositions in un-ionized form (for example as triethylamine or formic acid), but are determined based on their ionized form.

The residual impurity content can be determined by methods known in the art, for example those described in US 2016/0237210 and U.S. Pat. No. 9,287,471 using ion chromatography. For example, determination can be accomplished via ion exchange, of a sample obtained by dissolving 2.4 gram of copolycarbonate in 20 mL of dichloromethane and extracting with 10 mL of distilled, deionized water for 1 hour. The water layer is analyzed by ion chromatography with respect to the desired anions, cations, and amines, in particular fluoride, acetate, formate, chloride, nitrite, bromide, nitrate, phosphite, sulphate, oxalate, phosphate, citrate, lithium, sodium, potassium, ammonium, magnesium, calcium, and diethylamine and triethylamine. In another aspect of quantitative analysis of ions, the sample can be submerged in de-ionized water kept at 55° C. for 24 hours, the anions released into the water then analyzed via ion chromatography, e.g., with a Dionex DX500 Ion Chromatograph. Alternatively, quantitative analysis of metals and other compounds can be carried out by conventional inductively coupled plasma emission spectroscopy (ICP) methods to determine the presence of each constituent to the parts per billion (ppb) levels.

The copolycarbonates can be derived from monomers (phthalimidine, high heat monomer, or BPA) having both a high level of organic purity (e.g., measured by high pressure liquid chromatography (HPLC) of greater than or equal to 99.6 wt %, or greater than or equal to 99.7 wt %) and a sulfur level of less than or equal to 2 parts per million (ppm) as measured by a commercially available Total Sulfur Analysis based on combustion and coulometric detection. The organic purity can be defined as 100 wt % minus the sum of known and unknown impurities detected using ultraviolet (UV) (see HPLC method in Nowakowska et al., *Polish J. Appl. Chem.*, XI (3), 247-254 (1996)). In addition, an end-capping agent is present during manufacture of the high heat copolycarbonate such that high heat copolycarbonate comprises a free hydroxyl level less than or equal to 250 ppm, or less than or equal to 200 ppm, or less than or equal to 150 ppm.

The copolycarbonates have a weight average molecular weight (Mw) of 10,000 to 50,000 Da, or 16,000 to 30,000 Da, as measured by gel permeation chromatography (GPC), using a crosslinked styrene-divinylbenzene column and calibrated to BPA homopolycarbonate references. GPC samples are prepared at a concentration of 1 mg per ml and are eluted at a flow rate of 1.5 ml per minute.

The copolycarbonates have a high glass transition temperature (Tg). The Tg of the high heat copolycarbonates is 200 to 260° C., determined by DSC per ASTM D3418 with a 20° C./min heating rate.

The copolycarbonates have an improved hydrolytic stability as compared to a polycarbonate of the same Tg that comprises the same phthalimidine carbonate units and the same BPA carbonate units but no high heat carbonate units.

The copolycarbonates can be present in an amount of 10 to 100 wt %, or 85 to 99.8 wt %, or 20 to 80 wt %, or 40 to 70 wt %, each based on the total weight of the polycarbonate compositions.

In addition to the phthalimidine copolycarbonate, the polycarbonate composition can comprise a BPA homopolycarbonate, for example less than 15 wt % of a BPA homopolycarbonate, based on the total weight of the polycarbonate composition. The BPA homopolycarbonate can be derived from a BPA monomer having a purity less than 99.7% determined by HPLC. Alternatively, the BPA homopolycarbonate can be derived from a high purity BPA monomer having a purity equal to or greater than 99.7% determined by HPLC.

In an aspect, the BPA polycarbonate homopolymer ("homopolycarbonate") is a linear BPA homopolycarbonate having an Mw of 10,000 to 100,000 Da, or 15,000 to 50,000 Da, or 17,000 to 35,000 Da, as measured by gel permeation chromatography (GPC), using a crosslinked styrene-divinylbenzene column and calibrated to BPA homopolycarbonate references. GPC samples are prepared at a concentration of 1 mg per ml and are eluted at a flow rate of 1.5 ml per minute.

More than one BPA homopolycarbonate can be present. For example, the polycarbonate compositions can comprise a first BPA homopolycarbonate having an Mw of 20,000 Da to 25,000 Da and a second BPA homopolycarbonate having an Mw of 28,000 to 32,000 Da, or a second BPA homopolycarbonate having an Mw of 16,000 Da to 20,000 Da, each measured by GPC using BPA homopolycarbonate standards. The weight ratio of the first BPA homopolycarbonate relative to the second BPA homopolycarbonate is 10:1 to 1:10, or 5:1 to 1:5, or 3:1 to 1:3 or 2:1 to 1:2.

In an aspect, the bisphenol A (BPA) purity of the polycarbonate composition is equal to or greater than 99.6% or equal or greater than 99.7% measured using HPLC. As used herein, the BPA purity of the polycarbonate composition refers to the overall purity of the BPA monomer used to prepare the high heat copolycarbonate and the BPA homopolycarbonate, if present. The BPA purity of a polycarbonate composition can be determined by a mild depolymerization followed by a HPLC analysis. For example, about 200 milligrams (mg) of the polycarbonate composition is dissolved in 5 ml of tetrahydrofuran (THF) and 2 ml of a 10% solution of potassium hydroxide diluted in methanol. The depolymerization of polycarbonate is carried out with the use of these solvents. The solution is shaken for 2 hours. Then, 2 milliliters (ml) of acetic acid are added to protonate the BPA carbonate salts and decrease the pH. The solution is shaken again for half an hour for homogenization and dissolution of all precipitates. The sample is analyzed by HPLC. The wt % of BPA impurities in the polycarbonate composition can be calculated by:

$$\text{wt \% of impurities in } BPA = \frac{\text{wt \% of impurities} * 254}{228}. \quad \text{(equation 1)}$$

In equation 1, "wt % of impurities" refers to the impurities measured by HPLC after depolymerization. Because the BPA molar mass is different from the carbonated BPA, the wt % of impurities is multiplied by 254 grams per mole (g/mol) and divided by 228 g/mol. An amount of 254 g/mol and 228 g/mol correspond to the BPA carbonate the BPA molar mass, respectively.

In some aspects, it can be advantageous to use copolycarbonates and BPA homopolycarbonates with very low residual contents of volatile impurities. For example, the polymer components can have a content of chlorobenzene and other aromatic chlorine compounds of less than 10 ppm, or less than 5 ppm, or less than 2 ppm, dichloromethane of less than 1 ppm, or less than 0.5 ppm, monohydric phenols such as phenol, tert-butylphenol and cumylphenol of less than 15 ppm, or less than 5 ppm, or less than 2 ppm, and alkanes of less than 10 ppm, or less than 5 ppm. In other aspects, the polymers can have residual contents of: carbon tetrachloride of less than 0.01 ppm, diaryl carbonates, in particular diphenyl carbonate and di-tert-butyl phenolcarbonate, of less than 5 ppm, or less than 2 ppm, BPA and other bisphenols of less than 5 ppm, or less than 2 ppm, or less than 0.5 ppm, sodium and other alkali metals and alkaline earth metals of less than 0.05 ppm, cresols of less than 1 ppm, or less than 0.2 ppm, phenolic OH groups of less than 300 ppm, or less than 200 ppm, or less than 100 ppm, alkaline earth metals of less than 0.1 ppm, or less than 0.05 ppm, pyridine of less than 1 ppm, or less than 0.1 ppm, nonhalogenated aromatic compounds such as xylene and toluene of less than 10 ppm, or less than 5 ppm. Methods for obtaining and measuring these amounts are described, for example, in US2012/0157653.

The polycarbonate compositions can also include a copolycarbonate consisting of BPA carbonate units and phthalimidine carbonate units of formula (1) or (1a), preferably phthalimidine carbonate units derived from PPPBP or MPP. The polycarbonate compositions can also include a copolycarbonate consisting of BPA carbonate units and BPI carbonate units.

The polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

The polycarbonate compositions can include an organosulfonic stabilizer as described herein to improve the color stability of the composition after the composition is molded under aggressive conditions, typically at high melt temperatures, such as 350° C. or higher, or prolonged residence times during molding, such as times exceeding 7.5 or 10 minutes, or both. In some aspects it is possible to simultaneously improve the initial color of the polycarbonate composition and the color stability of the composition after the composition is molded under aggressive conditions, typically at high melt temperatures, such as 350° C. or higher, or prolonged residence times during molding, such as times exceeding 7.5 or 10 minutes, or both.

The organosulfonic stabilizer can be an aryl or aliphatic sulfonic acid, including a polymer thereof, an aryl or an aliphatic sulfonic acid anhydride, or an aryl or aliphatic ester of an aryl or aliphatic sulfonic acid, or a polymer thereof. In particular, the organosulfonic stabilizer is a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; an anhydride of a $C_{1-30}$ alkyl sulfonic acid, a $C_{6-30}$ aryl sulfonic acid, a $C_{7-30}$ alkylarylene sulfonic acid, or a $C_{7-30}$ arylalkylene sulfonic acid; or a $C_{6-30}$ aryl ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; or a $C_{1-30}$ aliphatic ester of a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer. A combination of one or more of the foregoing can be used.

In preferred aspects, the organosulfonic stabilizers are of formula (8)

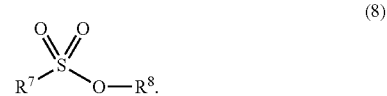

(8)

In formula (8), $R^7$ is each independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its corresponding $C_{1-32}$ alkyl ester. The $C_{2-32}$ ethylenically unsaturated aromatic sulfonic acid can be of the formula

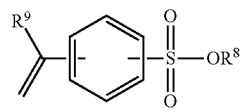

wherein $R^9$ is hydrogen or methyl, and $R^8$ is as defined in formula (8). Preferably the ethylenically unsaturated group and the sulfonic acid or ester group are located para on the phenyl ring.

Further in formula (8), $R^8$ is hydrogen; or $R^8$ is $C_{1-30}$ alkyl; or $R^8$ is a group of the formula —S(=O)$_2$—$R^7$. When $R^8$ is a group of the formula —S(=O)$_2$—$R^7$, each $R^7$ in the compound of formula (8) can be the same or different, but preferably each $R^7$ is the same.

In an aspect in formula (8), $R^7$ is a $C_{6-12}$ aryl, $C_{7-24}$ alkylarylene, or a polymer unit derived from a $C_{2-14}$ ethylenically unsaturated aromatic sulfonic acid or its ester; and $R^8$ is hydrogen, $C_{1-24}$ alkyl, or a group of the formula —S(=O)$_2$—$R^7$ wherein $R^7$ is a $C_{6-12}$ aryl or $C_{7-24}$ alkylarylene.

In a preferred aspect, $R^7$ is a $C_{7-10}$ alkylarylene or a polymer unit derived from a $C_{2-14}$ ethylenically unsaturated aromatic sulfonic acid, and $R^8$ is a hydrogen, $C_{1-25}$ alkyl, or a group of the formula —S(=O)$_2$—$R^7$ wherein $R^7$ is a $C_{7-10}$ alkylarylene. In a specific aspect, $R^7$ is a $C_{7-10}$ alkylarylene and $R^8$ is a hydrogen or $C_{1-6}$ alkyl. In still another aspect, $R^7$ is a $C_{7-10}$ alkylarylene and $R^8$ is a hydrogen or $C_{12-25}$ alkyl, or $R^8$ is a $C_{14-20}$ alkyl.

In specific aspect, $R^7$ is a polymer unit derived from a $C_{2-14}$ ethylenically unsaturated aromatic sulfonic acid, preferably p-styrene sulfonic acid or para-methyl styrene sulfonic acid, such that in formula (8) $R^8$ is hydrogen.

In an aspect, the organosulfonic stabilizer is a $C_{1-10}$ alkyl ester of a $C_{7-12}$ alkylarylene sulfonic acid, preferably of p-toluene sulfonic acid. More preferably the stabilizer is a $C_{1-6}$ alkyl ester of p-toluene sulfonic acid, such as butyl tosylate.

In another aspect, the organosulfonic stabilizer is an anhydride of a $C_{7-12}$ alkylarylene sulfonic acid, preferably para-toluene sulfonic anhydride.

In still another aspect, $R^7$ is a $C_{11-24}$ alkylarylene sulfonic acid, and $R^8$ is hydrogen. Alternatively, $R^7$ is a $C_{16-22}$ alkylarylene sulfonic acid, and $R^8$ is hydrogen.

The organosulfonic stabilizer can be used in an amount of 2 to 40 ppm, or 2 to 20 ppm, or 4 to 15 ppm, or 4 to 10 ppm, or 4 to 8 ppm by weight based on the total weight of the organic components of the polycarbonate composition.

The polycarbonate composition can also contain an epoxy additive. The inclusion of an epoxy compound can be used as a chain extender to improve molecular weight stability of the polycarbonate composition after hydroaging (for instance at 85° C. and 85% relative humidity) or autoclaving at temperatures of 121° C., 134° C., 155° C., or other temperatures above 100° C. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like). Specific commercially available exemplary epoxy functionalized stabilizers include Cycloaliphatic Epoxide Resin ERL-4221 supplied by Union Carbide Corporation (a subsidiary of Dow Chemical), Danbury, Conn.; and epoxy modified acrylates such as JONCRYL ADR-4300 and JONCRYL ADR-4368, available from BASF. Epoxy additives are typically used in amounts of up to 1 wt %, or 0.001 to 1 wt %, or 0.001 to 0.5 wt %, based on the total weight of the polycarbonate composition. In an aspect, the epoxy additive can be included in an amount of 0.001 to 0.3 wt %, or 0.01 to 0.3 wt %, or 0.1 to 0.3 wt %, based on the total weight of the polycarbonate composition. Use of greater amounts of epoxy compound can cause more splay, i.e., mold lines which fan outward from the point of injection into the mold, and observable to the unaided eye in molded optical articles comprising the polycarbonate composition.

The polycarbonate compositions can include various additives ordinarily incorporated into polymer compositions of this type, with the proviso that the additive(s) are selected so as to not significantly adversely affect the desired properties of the polycarbonate composition, in particular melt flow, optical clarity, and thermal properties. Such additives can be mixed at a suitable time during the mixing of the components for forming the composition. Additives include antioxidants, heat stabilizers, light stabilizers, ultraviolet (UV) light stabilizers, plasticizers, lubricants, mold release agents, antistatic agents, colorants such as organic dyes, surface effect additives, radiation stabilizers, flame retardants, anti-drip agents, and impact modifiers. In an aspect, the polycarbonate composition further comprises a processing aid, a heat stabilizer, an ultraviolet light absorber, a colorant, a flame retardant, an impact modifier, or a combination thereof. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0 to 5 wt % or 0.01 to 5 wt %, based on the total weight of the polycarbonate composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition, excluding any filler.

Light stabilizers, including ultraviolet light (UV) absorbers, can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy- 4-n-octoxy benzophenone, or combinations comprising at least one of the foregoing light stabilizers. UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1,3,5-triazin-2-yl]-5-(octyloxy)-phenol (CYASORB* 1164); 2,2'-(1,4-phenylene)bis(4H-3,1-benzoxazin-4-one) (CYASORB* UV-3638); 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; phenol, 2-(2H-benzotriazol-2-yl)-4,6-bis(1-methyl-1-phenylethyl)- (TINUVIN* 234); BCAP bismalonate from Clariant; nano-size inorganic materials such as titanium oxide, cerium oxide, and zinc oxide, all with particle size less than or equal to 100 nanometers, or combinations comprising at least one of the foregoing UV absorbers. Light stabilizers are used in amounts of 0.01 to 5 parts by weight, based on 100 parts by weight of the polycarbonate composition.

The polycarbonate compositions can optionally include flame retardants of various types. In an aspect, a brominated flame retardant such as a brominated polycarbonate can be used. In another aspect, the flame retardant can be a flame retardant salt, for example an alkali metal salt of a perfluorinated $C_1$-$C_{16}$ alkyl sulfonate, such as potassium perfluorobutane sulfonate (Rimar salt), potassium perfluoroctane sulfonate, tetraethylammonium perfluorohexane sulfonate, potassium diphenylsulfone sulfonate (KSS); a sodium benzene sulfonate such as sodium toluene sulfonate (NATS); an alkali metal or alkaline earth metal salt of carbonic acid, such as $Na_2CO_3$, $K_2CO_3$, $MgCO_3$, $CaCO_3$, and $BaCO_3$; or a fluoro-anion complex such as $Li_3AlF_6$, $BaSiF_6$, $KBF_4$, $K_3AlF_6$, $KAlF_4$, $K_2SiF_6$, or $Na_3AlF_6$. Rimar salt, KSS, and NATS, alone or in combination with other flame retardants, are particularly useful.

Organophosphorus flame retardants can be used. Organophosphorus flame retardants include aromatic organophosphorus compounds having at least one organic aromatic group and at least one phosphorus-containing group, as well as organic compounds having at least one phosphorus-nitrogen bond. In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. In an aspect the aromatic group is the same as an aromatic group of the polycarbonate backbone, such as a bisphenol group (e.g., bisphenol A), a monoarylene group (e.g., a 1,3-phenylene or a 1,4-phenylene), or a combination thereof. The phosphorus-containing group can be a phosphate (P(=O)(OR)$_3$), phosphite (P(OR)$_3$), phosphonate (RP(=O)(OR)$_2$), phosphinate (R$_2$P(=O)(OR)), phosphine oxide (R$_3$P(=O)), or phosphine (R$_3$P), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an aspect the aromatic organophosphorus compound is a monomeric phosphate. Representative monomeric aromatic phosphates are of the formula (GO)$_3$P=O, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some aspects G corresponds to a monomer used to form the polycarbonate, e.g., bisphenol A or resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas

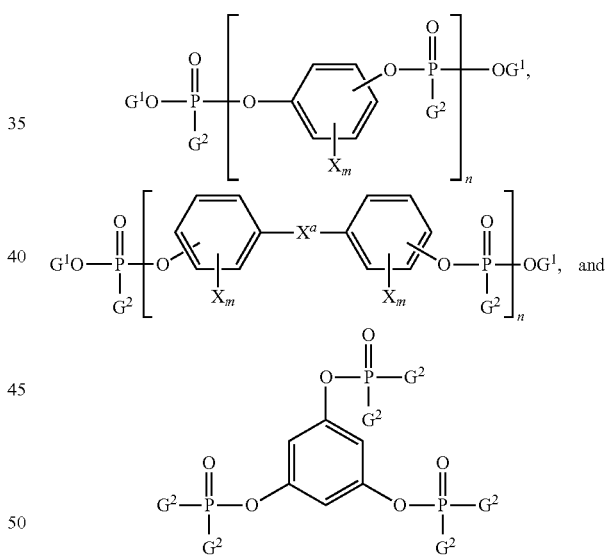

wherein each $G^1$ is independently a $C_{1-30}$ hydrocarbyl; each $G^2$ is independently a $C_{1-30}$ hydrocarbyl or hydrocarbyloxy; $X^a$ is as defined in formula (3) or formula (4); each X is independently a bromine or chlorine; m is 0 to 4, and n is 1 to 30. In a specific aspect, $X^a$ is a single bond, methylene, isopropylidene, or 3,3,5-trimethylcyclohexylidene. Di- or polyfunctional aromatic phosphorus-containing compounds of this type include resorcinol tetraphenyl diphosphate (RDP), the bis(diphenyl) phosphate of hydroquinone and bisphenol A bis(diphenyl) phosphate (BPADP), and their oligomeric and polymeric counterparts.

Other aromatic organophosphorus compounds have two or more phosphorus-containing groups, and are inclusive of acid esters of the formula

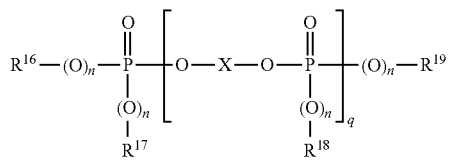

wherein $R^{16}$, $R^{17}$, $R^{18}$, and $R^{19}$ are each independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one of $R_{16}$, $R^{17}$, $R^{18}$, $R^{19}$, and X is an aromatic group. In some aspects $R^{16}$, $R^{17}$, $R^{18}$, and $R^{19}$ are each independently $C_{1-4}$ alkyl, naphthyl, phenyl($C_{1-4}$)alkylene, or aryl groups optionally substituted by $C_{1-4}$ alkyl. Specific aryl moieties are cresyl, phenyl, xylenyl, propylphenyl, or butylphenyl. In some aspects X in formula (9) is a mono- or poly-nuclear aromatic $C_{6-30}$ moiety derived from a diphenol. Further in formula (9), n is each independently 0 or 1; in some aspects n is equal to 1. Also in formula (9), q is from 0.5 to 30, from 0.8 to 15, from 1 to 5, or from 1 to 2. Specifically, X can be represented by the following divalent group

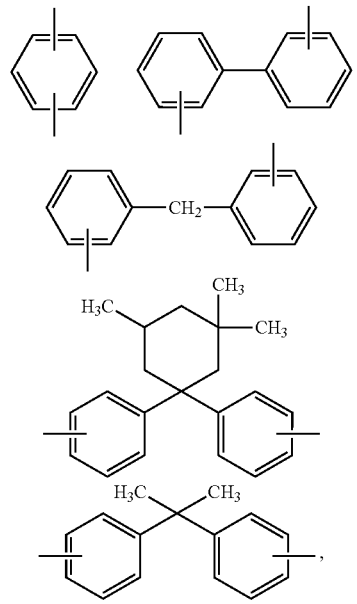

or a combination thereof.

In these aspects, each of $R^{16}$, $R^{17}$, $R^{18}$, and $R^{19}$ can be aromatic, i.e., phenyl, n is 1, and p is 1 to 5, specifically 1 to 2. In some aspects at least one of $R^{16}$, $R^{17}$, $R^{18}$, $R^{19}$, and X corresponds to a monomer used to form the polycarbonate, e.g., bisphenol A or resorcinol. In another aspect, X is derived especially from resorcinol, hydroquinone, bisphenol A, or diphenylphenol, and $R^{16}$, $R^{17}$, $R^{18}$, $R^{19}$, is aromatic, specifically phenyl. A specific aromatic organophosphorus compound of this type is resorcinol bis(diphenyl phosphate), also known as RDP.

Another specific class of aromatic organophosphorus compounds having two or more phosphorus-containing groups are compounds of the formula

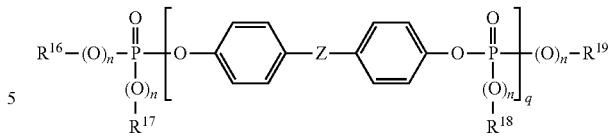

wherein $R^{16}$, $R^{17}$, $R^{18}$, $R^{19}$, n, and q are as defined for formula (9) and wherein Z is $C_{1-7}$ alkylidene, $C_{1-7}$ alkylene, $C_{5-12}$ cycloalkylidene, —O—, —S—, —SO$_2$—, or —CO—, specifically isopropylidene. A specific aromatic organophosphorus compound of this type is bisphenol A bis(diphenyl phosphate), also known as BPADP, wherein $R^{16}$, $R^{17}$, $R^{18}$, and $R^{19}$ are each phenyl, each n is 1, and q is from 1 to 5, from 1 to 2, or 1.

The organic compound containing a phosphorus-nitrogen bond can be a phosphazene, phosphonitrilic chloride, phosphorus ester amide, phosphoric acid amide, phosphonic acid amide, phosphinic acid amide, or tris(aziridinyl) phosphine oxide. These flame-retardant additives are commercially available. In an aspect, the organic compound containing a phosphorus-nitrogen bond is a phosphazene or cyclic phosphazene of the formulas

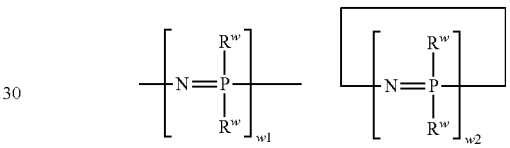

wherein w1 is 3 to 10,000 and w2 is 3 to 25, or 3 to 7, and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. A combination of different phosphazenes can be used. A number of phosphazenes and their synthesis are described in H. R. Allcook, "Phosphorus-Nitrogen Compounds" Academic Press (1972), and J. E. Mark et al., "Inorganic Polymers" Prentice-Hall International, Inc. (1992).

The polycarbonate compositions can further comprise a cyclic siloxane or a linear siloxane to impart flame retardant properties. The cyclic siloxane can include those with the general formula

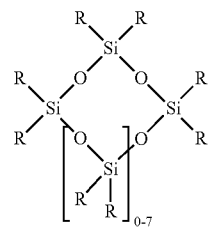

wherein each R in the cyclic siloxane is independently $C_{1-36}$ alkyl, fluorinated or perfluorinated $C_{1-36}$ alkyl, $C_{1-36}$ alkoxy, $C_{6-14}$ aryl, or $C_{6-14}$ aryloxy. In an aspect, at least one R can be a phenyl. Examples of cyclic siloxanes include octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane. Octaphenylcyclotetrasiloxane is preferred. Linear siloxanes can also be used. The linear siloxanes can be a linear phenyl containing siloxane such as a poly(phenylmethylsiloxane). In an aspect, the polycarbonate compositions contain 0.01% to 1% of a cyclic siloxane, a linear siloxane, or a combination thereof.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

In certain aspects, which are preferred, the polycarbonate compositions can have a low residual impurity content, in particular less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. The foregoing residual impurities can exist in the polycarbonate compositions in un-ionized form (for example as triethylamine or formic acid), but are determined based on their ionized form.

The polycarbonate compositions can be molded under standard molding conditions in range of 300 to 350° C. depending on the glass transition temperature of the composition. For example, the polycarbonate compositions can be molded at a temperature of 100 to 175° C. above the glass transition temperature of the polycarbonate composition for a residence time of 2 to 20 minutes.

The polycarbonate compositions can have a Tg of 200° C. or higher, or 200° C. to 260° C., determined by DSC per ASTM D3418 with a 20° C./min heating rate.

The polycarbonate compositions can have excellent transparency. In an aspect, the polycarbonate compositions can have a haze of less than 5%, or less than 3%, or less than 1.5%, or less than 1.0%, and a transmission greater than 82%, preferably greater than 84%, preferably greater than 85%, or greater than 86% each measured according to ASTM D1003-00 using the color space CIE1931 (Illuminant C and a 2° observer) on a molded plaque with a 3.2 mm thickness. In another aspect, the polycarbonate compositions can have a haze of less than 15%, or less than 10%, more preferably less than 5%, even more preferably less than 1.5%, or less than 1.0% and a total transmission greater than 84% or greater than 86%, each measured according to ASTM D1003-00 on a molded plaque with a 3.0 mm thickness.

The polycarbonate compositions can have excellent color. In an aspect, the polycarbonate compositions a yellowness index of less than 30, preferably less than 20, more preferably less than 10 measured according to ASTM D1925 on a plaque of 3.2 mm thickness molded at a temperature of 350° C. for a residence time of 2 minutes.

The polycarbonate compositions can be provided as pellets and are useful to form transparent optical devices such as windows, sight glasses, visors, films, and lenses via various methods. The methods to make the optical articles are not particularly limited. Exemplary methods include part production via multi-cavity tools; molding such as injection molding, gas assist injection molding, vacuum molding, over-molding, compression molding, rotary molding, heat/cool molding, overmolding, transfer molding, or cavity molding; thermoforming; extruding; calendaring; casting; and the like.

Advantageously, the optical articles have no significant part distortion or discoloration when the articles are subjected to a secondary operation such as over-molding, or coating with high temperature curing, or a combination thereof. High temperature cure of a coating can be, for example, 100° C. or higher, for example 100 to 250° C. In some aspects, "no significant part distortion" includes a volume distortion of less than 10 volume percent (vol %), or less than 5 vol %, or less than 1 vol %. Significant discoloration can be detected by the unaided eye at a distance of 18 inches. The polycarbonate compositions, which have good flow (MVR) for excellent mold filling properties while maintaining desirable mechanical properties can, in the manufacture of optical articles, provide a high degree of reproducibility for successive optical articles molded from the polycarbonate composition.

The lens can be a planar (flat) lens, a curved lens, a cylindrical lens, a toric lens, a sphero-cylindrical lens, a fresnel lens, a convex lens, a biconvex lens, a concave lens, a biconcave lens, a convex-concave lens, a plano-convex lens, a plano-concave lens, a lenticular lens, a gradient index lens, an axicon lens, a conical lens, an astigmatic lens, an aspheric lens, a corrective lens, a diverging lens, a converging lens, a compound lens, a photographic lens, a doublet lens, a triplet lens, an achromatic lens, or a multi-array lens. Thus, the lens can be a layer of a multi-layer lens.

The lenses can be defined by several dimensional features such as thickness, effective lens area, diameter of an effective lens area, and an overall diameter. Lens thickness, as defined herein, is measured at the center of the lens (i.e., along the z axis, orthogonal to the diameter of the lens which is measured in the x-y plane of the lens). Since lenses have curvature, the thickness of the lens can vary along the contour of the surface. Also, depending upon the type of the lens (convex, concave, etc.) the variation of the thickness can differ widely. In an aspect, the lens has a thickness of a thickness of 0.1 mm to 50 cm, or 0.1 mm to 10 cm, 0.1 mm to 1 cm, or 0.1 mm to 0.5 cm, or 0.1 mm to 50 mm, measured at the thickest part of the lens. In a specific aspect, the lens has a thickness of 0.25 to 2.5 mm, or 0.5 to 2.4 mm, or 0.8 to 2.3 mm, measured at the center of the lens.

The size of the lens is characterized by the term "effective lens area," which is defined as the area of the lens where the curvature is positive, and hence light which is refracted through this area is usable in actual imaging. "Curvature" as defined herein, is the reciprocal of the optical radius of the lens (as defined by the light path). For example, a flat surface has infinite radius and therefore zero curvature. For those lenses that include a flat portion around the periphery of the lens, which is used for mounting the lens into the optical assembly, this flat portion is not considered part of the effective lens area. A typical lens has at least two surfaces, a first and a second surface. On the first (incident) surface, light enters the lens and exits through the second (refractive)

surface. One or both of these surfaces can have a curvature. The effective lens area as defined above can be the same for the first and second surfaces, or can be different for the first and second surfaces. Where different, the larger value of the effective surface area for the first and second surfaces is considered to be the effective lens area for the overall lens. The lens can have an effective lens area of 0.2 mm$^2$ to 10 m$^2$, or 0.2 mm$^2$ to 1 m$^2$, or 0.2 mm$^2$ to 10 cm$^2$, or 0.2 mm$^2$ to 5 mm$^2$, or 0.2 mm$^2$ to 100 mm$^2$.

Effective lens area diameter as defined herein describes the diameter measured at the outermost periphery of the effective (optically useable) area of the lens; whereas overall diameter of the lens is the diameter which includes the non-optically relevant flat portion. The lenses disclosed herein can have a diameter of an effective lens area of 0.1 mm to 500 cm, or 0.25 mm to 50 cm, or 0.5 mm to 1 cm, or 0.5 mm to 10 mm; or an overall diameter of 0.1 mm to 2 m, or 0.25 mm to 100 cm, or 0.5 mm to 2 cm, or 0.5 mm to 20 mm.

The lens can have an overall diameter of 0.1 mm to 500 cm, or 0.25 mm to 100 cm, or 0.5 mm to 2 cm, or 0.5 mm to 20 mm.

The lenses can have surface textures such as a macrotexture, a microtexture, a nanotexture, or a combination thereof on a surface of the lenses. Textures can also be imparted to the lenses using methods known in the art including but not limited to calendaring or embossing techniques. In an aspect, the lenses can pass through a gap between a pair of rolls with at least one roll having an embossed pattern thereon, to transfer the embossed pattern to a surface of the lenses. Textures can be applied to control gloss or reflection.

The shape of the lenses is not particularly limited. The lenses can also have different types. For example, the lenses can be a flat or planar lens, a curved lens, a cylindrical lens, a toric or sphero-cylindrical lens, a fresnel lens, a convex lens, a biconvex lens, a concave lens, a biconcave lens, a convex-concave lens, a plano-convex lens, a plano-concave lens, a lenticular lens, a gradient index lens, an axicon lens, a conical lens, an astigmatic lens, an aspheric lens, a corrective lens, a diverging lens, a converging lens, a compound lens, a photographic lens, a doublet lens, a triplet lens, an achromatic lens, or a multi-array lens.

The optical articles such as lenses can further comprise an indicium or a coating disposed on at least a portion of one or both sides of the lens to impart additional properties such as scratch resistance, ultra violet light resistance, aesthetic appeal, hydrophilicity, hydrophobicity, and the like. In an aspect, the coating is a hard coat, a UV protective coat, an anti-refractive coat, an anti-reflective coat, a scratch resistant coat, a hydrophobic coat, a hydrophilic coat, or a combination thereof. Coatings can be applied through standard application techniques such as overmolding, rolling, spraying, dipping, brushing, flow coating, or combinations comprising at least one of the foregoing application techniques.

Depending on the applications, at least a portion of a surface of the optical articles such as lens is metallized in some aspects. A metal layer can be disposed onto the surface of the optical articles with the aid of electrocoating deposition, physical vapor deposition, or chemical vapor deposition or a suitable combination of these methods. Sputtering processes can also be used. The metal layer resulting from the metallizing process (e.g., by vapor deposition) can be 0.001 to 50 micrometers (μm) thick. Chrome, nickel, aluminum, and the like can be listed as examples of vaporizing metals. Aluminum vapor deposition is used in an aspect as metal vapor deposition. The surface of the molded substrate can be treated with plasma, cleaned, or degreased before vapor deposition in order to increase adhesion.

The optical articles such as lenses can have low birefringence, which means that the optical articles can have low light distortion and a better quality image.

Exemplary lenses include a camera lens, a sensor lens, an illumination lens, a safety glass lens, an ophthalmic corrective lens, or an imaging lens.

The foregoing types of lenses can be used in a wide variety of applications. For example, the camera lens can be a mobile phone camera lens, a table camera lens, a security camera lens, a mobile phone camera lens, a tablet camera lens, a laptop camera lens, a security camera lens, a camera sensor lens, a copier camera lens, or a vehicle camera lens (e.g., an automotive camera lens).

The sensor lens can be a motion detector lens, a proximity sensor lens, a gesture control lens, an infrared sensor lens, or a camera sensor lens.

The illumination lens can be an indoor lighting lens, an outdoor lighting lens, vehicle headlamp lens, a vehicle foglight lens, a vehicle rearlight lens, a vehicle running light lens, a vehicle foglight lens, a vehicle interior lens, a light emitting diode (LED) lens, or an organic light emitting diode (OLED) lens.

The safety glass lens is a glasses lens, a goggles lens, a visor, a helmet lens, or other protective gear.

The ophthalmic corrective lens can be incorporated into monocles, corrective glasses (including bifocals, trifocals, progressive lens, and the like), contact lenses, and the like.

The imaging lens can be a scanner lens, a projector lens, a magnifying glass lens, a microscope lens, a telescope lens, a security lens, reading glasses lens, and the like.

Accordingly, the lenses can be incorporated into a wide variety of devices, including a camera (including reflex cameras), an electronic device (such as mobile phones, tablets, laptop computers, and desk computers), a vehicle (which as used herein means any transportation devices, for example bicycles, scooters, motorcycles, automobiles, buses, trains, boats, ships, and aircraft) a flashlight, a business machine (such as a copier or a scanner), a lighting device (including indoor lighting such as table lamps and ceiling lights, outdoor lighting such as floodlights and streetlights, vehicle headlights, rearlights, side lights, running lights, foglights, and interior lights), an imaging device (such as a microscope, a telescope, a projector, a security lens (e.g. in a door), or reading glasses), a safety article (such as goggles, glasses, and headgear such as helmets), a vision corrective article (glasses or contact lens), or a toy.

Optical devices can also be windows, and sight glasses such as microwave windows, visors, a safety goggle, a face shield, a fire shield, a helmet, a respirator, a component of a display screen, including a liquid crystal display screen, or an organic light-emitting diode display screen, a component of a screen such as a mining ore screen, a structural component of a building, a vehicle, or an appliance such as a pump, a microwave, a dishwasher, or a stove, a component of packaging, a component of an anti-fog assembly, or a component of an anti-reflective assembly.

The invention is further illustrated by the following non-limiting examples.

EXAMPLES

The monomers used in the Examples are described in Table 1.

TABLE 1

| Component | Chemical Description | Source |
|---|---|---|
| PPPBP | N-phenyl phenolphthalein bisphenol having a minimum purity of 99.8% by HPLC | SABIC |
| BPI | 1,1-bis-(4-hydrox-yphenyl)-3,3,5-trimethylcyclohexane having a minimum purity of 99.7 by HPLC) | Porus |
| BPA | Bisphenol A having a purity of 99.8%) | Momentive |
| BisAP | 4,4'-(1-phenylethylidene)bisphenol | Porus |
| DMIBP | 4,4'-(3,3-dimethyl-2,2-dihydro-1H-indene-diyl)diphenol | Porus |
| RedCross | 1,1-bis(4-hydroxyphenyl)cyclododecane | Porus |
| MPP | 2-methyl-3,3-bis(p-hydroxyphenyl)phthalimide having a purity of 99.9% | Shiridi |

Preparation of Copolycarbonates—General Prosecution

To a mixture of methylene chloride, DI water (9 L), optional BPA, high heat monomer other than PPPBP (8.73 mol), p-cumylphenol (144.9 g, 0.682 mol), triethylamine (30 g), and sodium gluconate (10 g) in a 75 L reactor equipped with mechanical stirring, recirculation line with pH probe, subsurface phosgene addition, chilled glycol condenser, caustic scrubber for exit gas, and caustic solution inlet was added at 227 g/min (addition rate was adjusted to control the time of addition. The "Phthalimidine Addition Time"= (Phthalimidine addition time (min))×100/divided by time (min.) for the addition of the theoretical amount phosgene) a solution of PPPBP (612.8 g, 1.56 mol) in 397 g of 33% NaOH and 1033 g of DI water while phosgene (2410 g) was added at 80 g/min. Aqueous caustic (33 wt %) was added as needed to maintain pH of 8 to 9 in the reactor. After 2410 g of phosgene was added, the reactor was then purged with nitrogen. A sample was obtained for GPC analysis. The material was rephosgenated again (for a total of 2610 g, 26.4 mol) and the Mw was determined. The process was repeated until the Mw increase was less than about 200 Da. The polymer mixture was transferred to the 100 L work-up tank. It was purified on a centrifuge train where the brine phase was separated and the polymer solution in methylene chloride was extracted with aqueous HCl and then washed with deionized water until titratable chlorides were less than 5 ppm. The polymer solution was then steam precipitated and the resultant polymer dried under hot nitrogen until volatile levels were <0.4 wt %.

Blending, Extrusion, and Molding Conditions

The compositions were made as follows. Stabilizers such as butyl tosylate which were used at ppm levels were first mixed with a small amount of resin to make a concentrate. The concentrate was then mixed in a paint shaker to completely mix the concentrate. This concentrate mixture as needed to the dry blend described below.

All solid were dry blended off-line as concentrates using one of the primary polymer powders as a carrier and starve-fed via gravimetric feeder(s) into the feed throat of the extruder. The remaining polymer(s) were starve-fed via gravimetric feeder(s) into the feed throat of the extruder as well. The liquid additives, if any, were fed before the vacuum using a liquid injection system. It will be recognized by one skilled in the art that the method is not limited to these processing steps or processing equipment.

Extrusion of all materials was performed on a Coperion ZSK-26 26 mm twin screw extruder twin-screw extruder (L/D ratio of 33/1) with a vacuum port located near the die face. The extruder has 9 zones, which were set at temperatures of 425° F., 530° F., 550° F., 550° F., 560° F., 560° F., 570° F., 570° F., 575° F., and 575° F. from feed zone to die. Screw speed was 300-500 rpm. It will be recognized by one skilled in the art that the method is not limited to these temperatures or processing equipment.

The compositions were molded after drying at 145° C. for 4 hours on an 85-ton Van Dorn HT series molding machine at a temperature 350° C. with a mold temperature of 140° C. It will be recognized by one skilled in the art that the method is not limited to these temperatures or processing equipment.

Testing Methods

Weight average molecular weight (Mw) determinations were performed using GPC using a cross linked styrene-divinyl benzene column, at a sample concentration of 1 milligram per milliliter, and as calibrated with BPA homopolycarbonate standards. Samples were eluted at a flow rate of 1.0 ml/min with methylene chloride as the eluent.

The hydrolytic stability of the copolymers was measured using an autoclave as follows. Inside a cellulose thimble (Whatman™ 2800105, 10 mm diameter, 50 mm length), 400 mg of resin powders were deposited. The thimbles with the samples were autoclaved inside a NAPCO Model 800-TD Test Chamber, at 120° C. and 15 psig for 2 hours. The samples were analyzed by GPC before and after autoclaving. The results were calculated, and the percentage of Mw drop or loss and is used as a relative representation of relative hydrostability of the copolymers.

Tg was determined by DSC (ASTM D3418, 20° C./min heating rate).

The UV stability was determined by using a Q-Lab QUV chamber equipped with UVA-340 lamps. Cast films were prepared by dissolving polymer powder (5 g) in 20 g of methylene chloride. Films were cast on glass plates using an 8-mil doctor blade. After evaporation of the solvent, the films were removed from the glass plates and dried overnight in an oven at 55° C. The resulting films had a thickness of approximately 40 micrometers.

Weathering of films. Polymer films were attached to 35 mm photographic slide mounts and exposed in a Q-Lab QUV chamber equipped with UVA-340 lamps at an irradiance of 0.67 W/m$^2$/nm at 340 nm. The films were exposed continuously at 50° C. and ambient humidity. At each checkpoint the films were moved vertically and horizontally to ensure uniform irradiation. Films were measured twice weekly using an X-Rite Color i7 spectrophotometer with Color iControl software. The measurements were done in transmission, UV included, large lens, and large aperture using the 10 degree observer function. Color was determined as Yellowness Index (YI) according to ASTM E-313 and is reported as the average of triplicate films.

Refractive indices (RI) of the molded color chips were measured by Metricon prism coupler with 632.8 nm wavelength light source in the TE mode.

Examples 1-21

Figure 2:
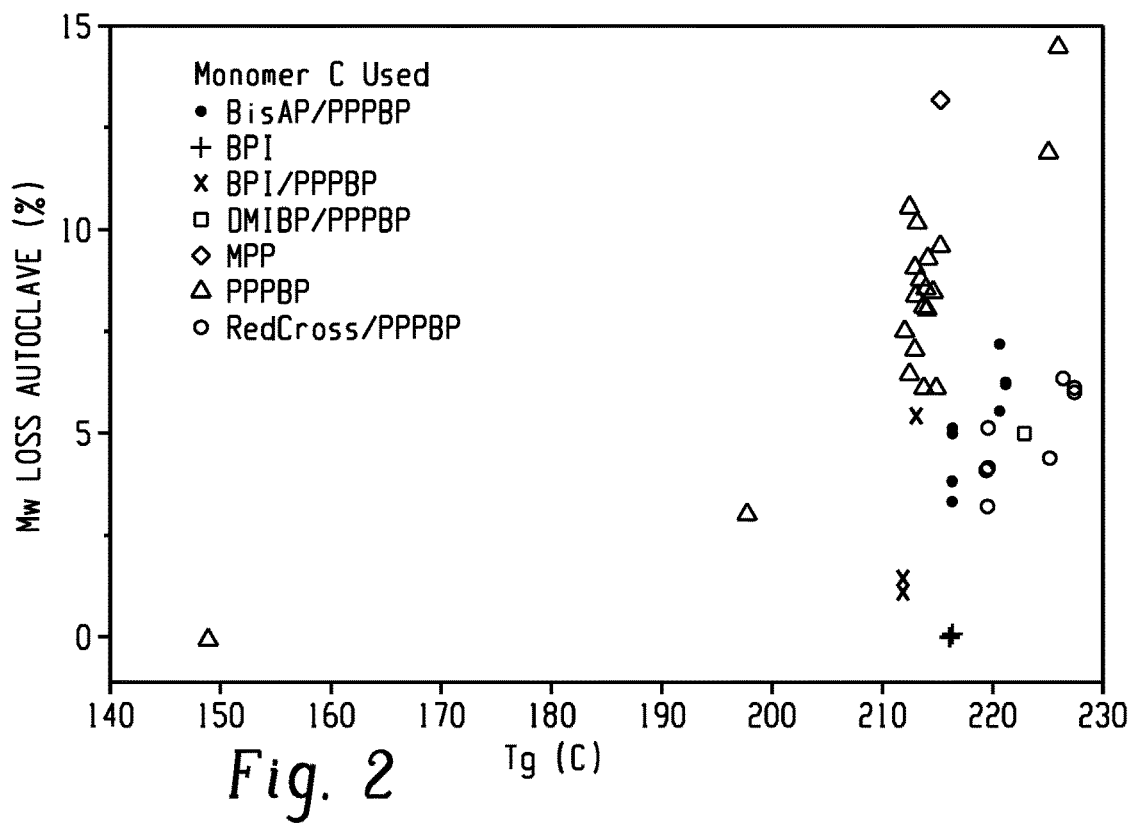
FIG. 2 shows the hydrostability of various high heat copolycarbonates as a function of Tg of the copolycarbonates.

Various copolycarbonates were prepared from the monomers shown in Table 2. Addition time is given as % of phosgene. The glass transition temperature, weight average molecular weight (g/mol), hydrolytic stability (Mw loss), and UV resistance were tested. The results are summarized in Tables 2 and 3 and FIGS. 1 and 2.

TABLE 2

| No. | MPP/PPPBP monomer | MPP/PPPBP monomer (Mol %) | Second high heat monomer | Second high heat monomer (Mol %) | MPP/PPPBP Addition Time | Tg (° C.) | Mw (Initial) | Mw (After Autoclave) | % Mw Loss on Autoclave | RI |
|---|---|---|---|---|---|---|---|---|---|---|
| Ex 1* | MPP | 45 | | 0 | 50 | 215 | 21,452 | 18,629 | 13.2 | |
| Ex 2* | MPP | 45 | | 0 | 50 | 215 | 21,452 | 18,686 | 12.9 | |
| Ex 3* | MPP | 45 | | 0 | 50 | 215 | 21,452 | 18,496 | 13.8 | |
| Ex 4* | | 0 | | 0 | 0 | 149 | 22,025 | 22,045 | −0.1 | |
| Ex 5* | PPPBP | 33 | | 0 | 50 | 198 | 22,075 | 21,413 | 3.0 | |
| Ex 6* | PPPBP | 45 | | 0 | 30 | 213 | 22,198 | 19,858 | 10.5 | 1.6095 |
| Ex 7* | PPPBP | 45 | | 0 | 30 | 215 | 22,355 | 20,982 | 6.1 | |
| Ex 8* | PPPBP | 45 | | 0 | 30 | 213 | 22,498 | 21,045 | 6.5 | |
| Ex 9* | PPPBP | 45 | | 0 | 50 | 213 | 21,130 | 19,647 | 7.0 | |
| Ex 10* | PPPBP | 45 | | 0 | 60 | 214 | 22,389 | 20,590 | 8.0 | |
| Ex 11* | PPPBP | 45 | | 0 | 50 | 214 | 21,725 | 19,957 | 8.1 | |
| Ex 12* | PPPBP | 45 | | 0 | 50 | 214 | 22,145 | 20,787 | 6.1 | |
| Ex 13* | PPPBP | 45 | | 0 | 50 | 213 | 23,134 | 21,091 | 8.8 | |
| Ex 14* | PPPBP | 45 | | 0 | 60 | 213 | 22,035 | 20,187 | 8.4 | |
| Ex 15* | PPPBP | 45 | | 0 | 30 | 213 | 23,317 | 21,195 | 9.1 | |
| Ex 16* | PPPBP | 45 | | 0 | 60 | 214 | 22,050 | 20,147 | 8.6 | |
| Ex 17* | PPPBP | 45 | | 0 | 60 | 212 | 21,304 | 19,696 | 7.5 | |
| Ex 18* | PPPBP | 45 | | 0 | 60 | 213 | 22,156 | 19,916 | 10.1 | |
| Ex 19* | PPPBP | 45 | | 0 | 30 | 215 | 22,459 | 20,533 | 8.6 | |
| Ex 20* | PPPBP | 45 | | 0 | 30 | 215 | 24,107 | 21,787 | 9.6 | |
| Ex 21* | PPPBP | 45 | | 0 | 30 | 214 | 22,266 | 20,204 | 9.3 | |
| Ex 22* | PPPBP | 55 | | 0 | 30 | 224 | 23,706 | 19,983 | 15.7 | |
| Ex 23* | PPPBP | 55 | | 0 | 30 | 226 | 23,270 | 19,898 | 14.5 | |
| Ex 24* | PPPBP | 55 | | 0 | 30 | 225 | 21,330 | 18,789 | 11.9 | |
| Ex 25 | PPPBP | 33 | BisAP | 67 | 50 | 216 | 22,712 | 21,849 | 3.8 | 1.6177 |
| Ex 26 | PPPBP | 33 | BisAP | 67 | 50 | 216 | 22,712 | 21,567 | 5.0 | |
| Ex 27 | PPPBP | 33 | BisAP | 67 | 50 | 216 | 22,348 | 21,608 | 3.3 | |
| Ex 28 | PPPBP | 33 | BisAP | 67 | 50 | 216 | 22,348 | 21,248 | 4.9 | |
| Ex 29 | PPPBP | 33 | BisAP | 67 | 50 | 221 | 27,892 | 26,184 | 6.1 | |
| Ex 30 | PPPBP | 33 | BisAP | 67 | 50 | 221 | 27,892 | 26,168 | 6.2 | |
| Ex 31 | PPPBP | 33 | BisAP | 67 | 50 | 221 | 28,046 | 26,509 | 5.5 | |
| Ex 32 | PPPBP | 33 | BisAP | 67 | 50 | 221 | 28,046 | 26,037 | 7.2 | |
| Ex 33 | PPPBP | 10 | BPI | 56 | 40 | 212 | 22,394 | 22,078 | 1.4 | |
| Ex 34 | PPPBP | 10 | BPI | 56 | 40 | 212 | 22,394 | 22,149 | 1.1 | |
| Ex 35 | PPPBP | 33 | BPI | 19 | 40 | 213 | 22,905 | 21,671 | 5.4 | |
| Ex 36 | PPPBP | 33 | DMIBP | 40 | 50 | 223 | 24,792 | 23,562 | 5.0 | 1.6044 |
| Ex 37 | PPPBP | 33 | RedCross | 35 | 50 | 220 | 22,133 | 21,228 | 4.1 | |
| Ex 38 | PPPBP | 33 | RedCross | 35 | 50 | 220 | 22,133 | 21,007 | 5.1 | |
| Ex 39 | PPPBP | 33 | RedCross | 35 | 50 | 220 | 22,826 | 22,095 | 3.2 | |
| Ex 40 | PPPBP | 33 | RedCross | 35 | 50 | 220 | 22,826 | 21,686 | 5.0 | |
| Ex 41 | PPPBP | 33 | RedCross | 35 | 50 | 225 | 28,721 | 27,484 | 4.3 | |
| Ex 42 | PPPBP | 33 | RedCross | 35 | 50 | 225 | 28,721 | 26,875 | 6.4 | |
| Ex 43 | PPPBP | 33 | RedCross | 35 | 50 | 226 | 26,849 | 25,253 | 5.9 | |
| Ex 44 | PPPBP | 33 | RedCross | 35 | 50 | 226 | 26,849 | 25,211 | 6.1 | |
| Ex 45* | | 0 | BPI | 80 | 0 | 216 | 21,835 | 21,823 | 0.1 | 1.559 |
| Ex 46* | | 0 | BPI | 80 | 0 | 216 | 22,477 | 22,469 | 0.0 | |

Total molar percent of phthalimidine monomer, high heat bisphenol monomer, and BPA monomer is 100%.
*Comparative examples Table 2 shows that PPPBP/BPA copolycarbonate with 33 mol % PPPBP carbonate units has a Tg of 198° C., which is too low to be useful even in the low temperature soldering processes. Increasing the PPPBP content can increase the Tg of the PPPBP/BPA copolycarbonate to the 210 to 250° C. range, but the hydrolytic stability of the copolycarbonate is dramatically reduced when the PPPBP content is increased (Table 2 and FIG. 1). Bisphenol A homopolycarbonate has good hydrolytic stability (Ex* 4) but it has a very low Tg of 149° C. A copolycarbonate derived from phthalimidine and another high heat monomer and optionally BPA can provide balanced Tg and hydrolytic stability (Examples 25-44 of Table 2, FIG. 2).

Applications needing high RI and good hydrolytic stability can be provided by copolycarbonates derived from a phthalimidine and the proper high heat monomer and optionally BPA. For example, when the high heat monomer is selected from BisAP, or DMIBP, the copolycarbonate derived therefrom can have high glass transition temperatures, good hydrolytic stability, and RIs of greater than 1.6. (Examples 25-32, 36 of Table 2).

Applications needing lower RI and good hydrolytic stability can be provided by copolycarbonates derived from a phthalimidine and the proper high heat monomer and optionally BPA. For example, when the high heat monomer is selected from BPI, or RedCross, the copolycarbonate derived therefrom can have high glass transition temperatures, good hydrolytic stability, and RIs of less than 1.6. (Examples 37-44 of Table 2 and Tables 4-8).

TABLE 3

UV Aging of Polymers and Copolymers

| Exposure (hours QUV-A) | Ex 4* 100% BPA PC | Ex 5* 33 mol % PPPBP | Ex 45* 80 mol % BPI | Ex 24* 55 mol % PPPBP | Ex 1* 45 mol % MPP |
|---|---|---|---|---|---|
| 0 | 0.0 | 0.0 | 0.0 | 0.0 | 0.0 |
| 70 | 0.1 | 5.6 | 0.2 | 5.8 | 0.6 |
| 140 | 0.2 | 6.8 | 0.5 | 7.6 | 1.0 |
| 234 | 0.4 | 8.9 | 1.3 | 10.0 | 1.6 |
| 306 | 0.6 | 10.4 | 2.3 | 11.0 | 2.1 |
| 401 | 1.0 | 11.4 | 5.2 | 11.6 | 3.0 |

*Comparative examples

Table 3 shows that PPPBP/BPA copolycarbonate has only moderate resistance to UV exposure. On the other hand, MPP/BPA copolymers and BPI/BPA copolymers have very good resistance to yellowing. MPP/BPA copolymers however have unsuitable hydrolytic stability for some applications. In an aspect requiring, improved UV stability, low YI and good hydrostability, useful copolycarbonates are where the phthalimidine monomer is MPP or PPP and the second high heat monomer is BPI. The copolycarbonates comprise 2 to 50 mole percent (mol %) of the phthalimidine carbonate units and 2 to 90 mol % of the high heat carbonate units, preferably the copolycarbonates comprise from 5 to 40 mol % of the MPP phthalimidine carbonate units and 25 to 80 mol % of the BPI high heat carbonate units, and or the copolycarbonates comprise from 5 to 35 mol % of the MPP phthalimidine carbonate units and 25 to 75 mol % of the BPI high heat carbonate units, each based on the total number of carbonate units in the copolycarbonates.

Examples 47-104

Copolycarbonates having high glass transition temperature and improved hydrolytic stability are illustrated in Tables 4-9.

Molecular models are used to calculate the Tgs as well as the viscosity, refractive index (RI), modulus and stress at break. The models used to calculate all properties except for flow use the following approach. First the repeating unit geometry is optimized using a Dreiding force field. (*J. Phys. Chem.* 94(26) (1990): pp. 8897-8909) Once the geometry is optimized, the backbone chain is defined (i.e., identification of side groups and atoms). The above properties are calculated using the concept of connectivity indices, as opposed to the most common group theory method. (See Ind. Eng. Chem. Res. 38 (1999): 1884-1892; Prediction of polymer properties. CRC Press, 2002; Properties of polymers: their correlation with chemical structure; their numerical estimation and prediction from additive group contributions. (Elsevier, 2009; and Polymer 45(26) (2004): 8651-8659)) This means that a database containing contribution of each group is not required. In addition, this the method can easily calculate chain parameters such as entanglement molecular weight, chain stiffness, glass transition and refractive index. Once these parameters have been calculated, mechanical and rheological properties are calculated based on entanglement theory. (*Hanser, Munich* (2006): 30-39) Specifically, in the case of calculating the mechanical properties EGP-like visco-plastic model is used and the rheological properties are calculated using tube models. (See *J. Mech. Phys. of Solids* 59(10) (2011): 2191-2207; *The Theory of Polymer Dynamics*. Vol. 73, Oxford Univ. Press, 1988; *J. Rheol.* 50(2) (2006): 207-234; and *J. Non-Newtonian Fl. Mech.* 128(1) (2005): 7-22) The models work by using the molecular weight distribution and the polymer chain architecture calculated using a Monte-Carlo simulation as an input. The Monte-Carlo simulations use the described polycondensation kinetics.

TABLE 4

Copolycarbonates having a Tg of 200-210° C. (for example 205° C.)

| | Compositions (mol %) | | | Calculated Properties | | | |
|---|---|---|---|---|---|---|---|
| No. | BPA | PPPBP | BPI | Melt Visc. (Poise at 1500 s$^{-1}$) | RI | Modulus (GPa) | Stress at break (MPa) |
| Ex 47* | 35.2 | 0.0 | 64.8 | 255 | 1.566 | 3.1 | 29.5 |
| Ex 48 | 38.3 | 5.0 | 56.7 | 258 | 1.571 | 3.1 | 31.8 |
| Ex 49 | 41.3 | 10.0 | 48.7 | 261 | 1.576 | 3.0 | 34.2 |
| Ex 50 | 44.4 | 15.0 | 40.6 | 264 | 1.581 | 3.0 | 36.6 |
| Ex 51 | 47.4 | 20.0 | 32.6 | 268 | 1.586 | 3.0 | 39.0 |
| Ex 52 | 53.5 | 30.0 | 16.5 | 274 | 1.596 | 2.9 | 43.7 |
| Ex 53 | 55.4 | 33.0 | 11.6 | 276 | 1.598 | 2.9 | 45.2 |
| Ex 54* | 59.6 | 40.0 | 0.4 | 280 | 1.605 | 2.9 | 48.5 |

*Comparative Examples

TABLE 5

Copolycarbonates having a Tg of 205-215° C. (for example 210° C.)

| | Compositions (mol %) | | | Calculated Properties | | | |
|---|---|---|---|---|---|---|---|
| No. | BPA | PPPBP | BPI | Melt Visc. (Poise at 1500 s$^{-1}$) | RI | Modulus (GPa) | Stress at break (MPa) |
| Ex 55* | 29.0 | 0.0 | 71.0 | 263 | 1.564 | 3.2 | 24.6 |
| Ex 56 | 33.4 | 6.6 | 60.0 | 266 | 1.571 | 3.1 | 28.1 |
| Ex 57 | 37.2 | 12.8 | 50.0 | 270 | 1.577 | 3.1 | 31.0 |
| Ex 58 | 41.0 | 19.0 | 40.0 | 274 | 1.583 | 3.1 | 34.0 |
| Ex 59 | 44.7 | 25.3 | 30.0 | 278 | 1.589 | 3.0 | 36.9 |
| Ex 60 | 48.5 | 31.5 | 20.0 | 282 | 1.595 | 3.0 | 39.8 |
| Ex 61 | 49.4 | 33.0 | 17.6 | 283 | 1.596 | 3.0 | 40.5 |
| Ex 62 | 52.3 | 37.7 | 10.0 | 287 | 1.601 | 3.0 | 42.8 |
| Ex 63 | 54.2 | 40.8 | 5.0 | 289 | 1.604 | 2.9 | 44.2 |
| Ex 64* | 56.0 | 44.0 | 0.0 | 291 | 1.607 | 2.9 | 45.7 |

*Comparative Examples

TABLE 6

Copolycarbonates having a Tg of 220-225° C. (for example 222° C.)

| | Compositions (mol %) | | | Calculated Properties | | | |
|---|---|---|---|---|---|---|---|
| No. | BPA | PPPBP | BPI | Melt Visc Poise at 1500 s$^{-1}$ | RI | Modulus (GPa) | Stress at break (MPa) |
| Ex 65* | 20.0 | 0.0 | 80.0 | 274 | 1.561 | 3.3 | 17.6 |
| Ex 66 | 20.5 | 4.5 | 75.0 | 280 | 1.565 | 3.3 | 18.0 |
| Ex 67 | 22.4 | 7.6 | 70.0 | 282 | 1.568 | 3.3 | 19.4 |
| Ex 68 | 24.2 | 10.8 | 65.0 | 284 | 1.571 | 3.3 | 20.9 |
| Ex 69 | 26.1 | 13.9 | 60.0 | 286 | 1.574 | 3.2 | 22.3 |
| Ex 70 | 29.8 | 20.2 | 50.0 | 290 | 1.580 | 3.2 | 25.2 |
| Ex 71 | 33.5 | 26.5 | 40.0 | 295 | 1.586 | 3.2 | 28.1 |
| Ex 72 | 37.2 | 32.8 | 30.0 | 299 | 1.592 | 3.1 | 31.0 |
| Ex 73 | 41.0 | 39.0 | 20.0 | 304 | 1.598 | 3.1 | 33.9 |
| Ex 74 | 44.7 | 45.3 | 10.0 | 308 | 1.604 | 3.1 | 36.8 |
| Ex 75* | 48.4 | 51.6 | 0.0 | 313 | 1.610 | 3.0 | 39.7 |

*Comparative Examples

TABLE 7

Copolycarbonates having a Tg of 227-230° C. (for example 228° C.)

| | Compositions (mol%) | | | Melt Visc Poise at | Calculated Properties | | Stress at break (MPa) |
|---|---|---|---|---|---|---|---|
| No. | BPA | PPPBP | BPI | 1500 s$^{-1}$ | RI | Modulus (GPa) | |
| Ex 76* | 12.0 | 0.0 | 88.0 | 284 | 1.558 | 3.4 | 11.3 |
| Ex 77 | 14.9 | 5.1 | 80.0 | 288 | 1.563 | 3.4 | 13.6 |
| Ex 78 | 18.6 | 11.4 | 70.0 | 292 | 1.569 | 3.3 | 16.5 |
| Ex 79 | 22.3 | 17.7 | 60.0 | 297 | 1.575 | 3.3 | 19.4 |
| Ex 80 | 26.0 | 24.0 | 50.0 | 301 | 1.581 | 3.3 | 22.3 |
| Ex 81 | 29.7 | 30.3 | 40.0 | 306 | 1.587 | 3.2 | 25.2 |
| Ex 82 | 33.4 | 36.6 | 30.0 | 311 | 1.594 | 3.2 | 28.0 |
| Ex 83 | 37.1 | 42.9 | 20.0 | 315 | 1.600 | 3.2 | 30.9 |
| Ex 84 | 40.8 | 49.2 | 10.0 | 320 | 1.606 | 3.1 | 33.8 |
| Ex 85* | 44.5 | 55.5 | 0.0 | 325 | 1.612 | 3.1 | 36.7 |

*Comparative Examples

TABLE 8

Copolycarbonates having a Tg of 225-235° C. (for example 230° C.)

| | Compositions (mol %) | | | Melt Visc Poise at | Calculated Properties | | Stress at break (MPa) |
|---|---|---|---|---|---|---|---|
| No. | BPA | PPPBP | BPI | 1500 s$^{-1}$ | RI | Modulus (GPa) | |
| Ex 86* | 6.0 | 0.0 | 94.0 | 292 | 1.556 | 3.5 | 6.7 |
| Ex 87 | 8.9 | 5.0 | 86.1 | 295 | 1.561 | 3.5 | 8.9 |
| Ex 88 | 11.8 | 10.0 | 78.2 | 299 | 1.566 | 3.4 | 11.2 |
| Ex 89 | 14.7 | 15.0 | 70.3 | 303 | 1.571 | 3.4 | 13.5 |
| Ex 90 | 20.5 | 25.0 | 54.5 | 310 | 1.580 | 3.3 | 18.0 |
| Ex 91 | 23.4 | 30.0 | 46.6 | 314 | 1.585 | 3.3 | 20.2 |
| Ex 92 | 25.1 | 33.0 | 41.9 | 317 | 1.588 | 3.3 | 21.6 |
| Ex 93 | 29.1 | 40.0 | 30.9 | 322 | 1.595 | 3.3 | 24.7 |
| Ex 94 | 34.9 | 50.0 | 15.1 | 330 | 1.604 | 3.2 | 29.2 |
| Ex 95* | 40.0 | 60.0 | 0.0 | 340 | 1.614 | 3.2 | 33.2 |

*Comparative Examples

TABLE 9

Copolycarbonates having a Tg of 245-255° C. (for example 250° C.)

| | Compositions (mol %) | | | Melt Visc Poise at | Calculated Properties | | Stress at break (MPa) |
|---|---|---|---|---|---|---|---|
| No, | BPA | PPPBP | BPI | 1500 s$^{-1}$ | RI | Modulus (GPa) | |
| Ex. 96* | 0.0 | 30.0 | 70.0 | 349.7 | 1.577 | 3.6 | 2.0 |
| Ex 97 | 0.0 | 33.0 | 67.0 | 355.4 | 1.579 | 3.7 | 1.9 |
| Ex 98 | 3.7 | 40.0 | 56.3 | 361.9 | 1.586 | 3.6 | 4.9 |
| Ex 99 | 6.4 | 45.0 | 48.6 | 366.6 | 1.590 | 3.6 | 7.0 |
| Ex 100 | 9.2 | 50.0 | 40.8 | 371.3 | 1.595 | 3.6 | 9.2 |
| Ex 101* | 14.7 | 60.0 | 25.3 | 381.1 | 1.605 | 3.5 | 13.5 |
| Ex 102* | 20.2 | 70.0 | 9.8 | 391.1 | 1.614 | 3.5 | 17.8 |
| Ex 103* | 21.9 | 73.1 | 5.0 | 394.2 | 1.617 | 3.5 | 19.1 |
| Ex 104* | 23.7 | 76.3 | 0.0 | 397.5 | 1.620 | 3.4 | 20.5 |

*Comparative examples

Set forth below are various aspects of the disclosure.

Aspect 1. A copolycarbonate optical article comprising a polycarbonate composition comprising: a copolycarbonate comprising: 2 to 60 mol % of phthalimidine carbonate units derived from a phthalimidine monomer, 2 to 90 mol % of high heat carbonate units derived from a high heat bisphenol monomer, and optionally 2 to 60 mol % of bisphenol A carbonate units derived from a bisphenol A monomer, each based on the sum of the moles of the phthalimidine carbonate units, the high heat carbonate units, and the bisphenol A carbonate units, wherein the copolycarbonate comprises less than 100 parts per million of each of the phthalimidine monomer, the high heat bisphenol monomer, and the bisphenol A monomer, and less than 5 ppm and preferable less than 2 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and the copolycarbonate is prepared from the phthalimidine monomer, the high heat bisphenol monomer, and optionally the bisphenol A monomer each having a purity of at least 99.6%, or at least 99.7% as determined by high performance liquid chromatography; and wherein the polycarbonate composition has a glass transition temperature of 200° C. to 260° C. determined by DSC as per ASTM D3418 with a 20° C./min heating rate and a yellowness index of less than 30, preferably less than 20, or less than 10 measured according to ASTM D1925 on a plaque of 3.2 mm thickness molded at a temperature of 350° C. for a residence time of 2 minutes.

Aspect 2. The copolycarbonate optical article of Aspect 1, wherein the polycarbonate composition has one or more of the following properties: an improved hydrolytic stability as compared to a polycarbonate of the same Tg that comprises the same phthalimidine carbonate units and the same bisphenol A carbonate units but no high heat carbonate units; a haze of less than 5%, or less than 1.5% and a total transmission greater than 82% or greater than 84%, each measured according to ASTM D1003-00 using the color space CIE1931 (Illuminant C and a 2° observer) on a molded plaque with a 3.2 mm thickness; or a yellow index (YI) less than or equal to 30, preferably less than 20, or less than 10 as measured by ASTM D1925 on a 3.2 mm plaque.

Aspect 3. The copolycarbonate optical article of Aspect 1, wherein the polycarbonate composition has one or more of the following properties: an improved UV stability as compared to a polycarbonate of the same Tg that comprises the 2-phenyl-3,3'-bis(4-hydroxy phenyl)phthalimidine carbonate units and the same bisphenol A carbonate units but no high heat carbonate units; a haze of less than 5%, or less than 1.5% and a total transmission greater than 82% or greater than 84%, each measured according to ASTM D1003-00 using the color space CIE1931 (Illuminant C and a 2° observer) on a molded plaque with a 3.2 mm thickness; or a yellow index (YI) less than or equal to 30, preferably less than 20, or less than 10 as measured by ASTM D1925 on a 3.2 mm plaque.

Aspect 4. The copolycarbonate optical article of any one of Aspects 1 to 3, wherein one or more of the phthalimidine monomer, the high heat bisphenol monomer, and the bisphenol A monomer have a purity of equal to or greater than 99.7% and a sulfur level of less than or equal to 2 parts per million as measured by a commercially available Total Sulfur Analysis based on combustion and coulometric detection.

Aspect 5. The copolycarbonate optical article of any one or more of Aspects 1 to 4, where the copolycarbonate comprises, based on the sum of the moles of the phthalimidine carbonate units, the high heat carbonate units, and the bisphenol A carbonate units: 2 to 35 mol % of the phthalimidine carbonate units; 10 to 80 mol % of the high heat carbonate units; and optionally 10 to 60 mol % of the bisphenol A carbonate units; and wherein the copolycarbonate has a glass transition temperature of 200° C. to 210° C., determined by DSC per ASTM D3418 with a 20° C./min heating rate.

Aspect 6. The copolycarbonate optical article of any one or more of Aspects 1 to 4, where the copolycarbonate comprises, based on the sum of the moles of the phthalimidine carbonate units, the high heat carbonate units, and the bisphenol A carbonate units: 5 to 45 mol % of the phthalimidine carbonate units; 10 to 75 mol % of the high heat carbonate units; and 25 to 55 mol % of the bisphenol A carbonate units; and wherein the copolycarbonate has a glass transition temperature of 205° C. to 215° C., determined by DSC as per ASTM D3418 with a 20° C./min heating rate.

Aspect 7. The copolycarbonate optical article of any one or more of Aspects 1 to 4, where the copolycarbonate comprises, based on the sum of the moles of the phthalimidine carbonate units, the high heat carbonate units, and the bisphenol A carbonate units: 2 to 50 mol % or 2 to 35 mol % of the phthalimidine carbonate units; 5 to 85 mol % or 35 to 85 mol % of the high heat carbonate units; and 10 to 45 mol % or 10 to 35 mol % of the bisphenol A carbonate units; and wherein the copolycarbonate has a glass transition temperature of 215° C. to 225° C., determined by DSC per ASTM D3418 with a 20° C./min heating rate.

Aspect 8. The copolycarbonate optical article of any one or more of Aspects 1 to 4, where the copolycarbonate comprises, based on the sum of the moles of the phthalimidine carbonate units, the high heat carbonate units, and the bisphenol A carbonate units: 2 to 55 mol % or 2 to 35 mol % of the phthalimidine carbonate units; 10 to 90 mol % or 40 to 90 mol % of the high heat carbonate units; and 5 to 40 mol % or 5 to 30 mol % of the bisphenol A carbonate units; and wherein the copolycarbonate has a glass transition temperature of 225° C. to 235° C., determined by DSC per ASTM D3418 with a 20° C./min heating rate.

Aspect 9. The copolycarbonate optical article of any one or more of Aspects 1 to 4, where the copolycarbonate comprises, based on the sum of the moles of the phthalimidine carbonate units, the high heat carbonate units, and the bisphenol A carbonate units: 25 to 55 mol % or 25 to 35 mol % of the phthalimidine carbonate units; 35 to 75 mol % or 65 to 75 mol % of the high heat carbonate units; and 0 to 15 mol % or 0 mol % of the bisphenol A carbonate units; and wherein the copolycarbonate has a glass transition temperature of 245° C. to 260° C., determined by DSC as per ASTM D3418 with a 20° C./min heating rate.

Aspect 10. The copolycarbonate optical article of any one or more of Aspects 1 to 9, wherein phthalimidine carbonate units are derived from 2-phenyl-3,3'-bis(4-hydroxy phenyl) phthalimidine.

Aspect 11. The copolycarbonate optical article of any one or more of Aspects 1 to 10, wherein the high heat carbonate units have the formula (3), (4), (5), (6), (7), or (8), wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^f$ is hydrogen or both $R^f$ together are a carbonyl group, each $R^3$ is independently $C_{1-6}$ alkyl, $R^4$ is hydrogen, $C_{1-6}$ alkyl, or phenyl optionally substituted with 1 to 5 $C_{1-6}$ alkyl groups, each $R^6$ is independently $C_{1-3}$ alkyl or phenyl; $X^a$ is a $C_{6-12}$ polycyclic aryl, $C_{3-18}$ mono- or polycycloalkylene, $C_{3-18}$ mono- or polycycloalkylidene, —C($R^h$)($R^g$)— wherein $R^h$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl, or -($Q^1$)$_x$-G-($Q^2$)$_y$- wherein $Q^1$ and $Q^2$ are each independently a $C_{1-3}$ alkylene, G is a $C_{3-10}$ cycloalkylene, x is 0 or 1, and y is 1; and j, m and n are each independently 0 to 4 or 0 to 1.

Aspect 12. The copolycarbonate optical article of Aspect 11, wherein the high heat carbonate units have the structural formula (3c) wherein each $R^1$ is independently hydrogen or $C_{1-4}$ alkyl, each $R^2$ is independently $C_{1-4}$ alkyl or hydrogen, and g is 0 to 10, and wherein preferably $R^1$ is methyl or hydrogen, $R^2$ is methyl or ethyl, and g is 0 to 3.

Aspect 13. The copolycarbonate optical article of Aspect 11, wherein the high heat carbonate units are derived from one or more of the following: 1,1-bis(4-hydroxyphenyl)-3,3,5-trimethyl-cyclohexane, 4,4'-(1-phenylethylidene)bisphenol, 4,4'-(3,3-dimethyl-2,2-dihydro-1H-indene-1,1-diyl) diphenol, 1,1-bis(4-hydroxyphenyl)cyclododecane, or 3,8-dihydroxy-5a,10b-diphenyl-coumarano-2',3',2,3-coumarane.

Aspect 14. The copolycarbonate optical article of any one or more of Aspects 1 to 13, wherein the polycarbonate composition further comprises a bisphenol A homopolycarbonate, a copolycarbonate consisting bisphenol A carbonate units and phthalimidine carbonate units, a second copolycarbonate consisting of bisphenol A carbonate units and 1,1-bis(4-hydroxyphenyl)-3,3,5-trimethyl-cyclohexane carbonate units, or a combination thereof.

Aspect 15. The copolycarbonate optical article of any one of more of Aspects 1 to 14, wherein the polycarbonate composition further comprises 2 to 40 ppm of an organosulfonic stabilizer of the formula (8) wherein each $R^7$ is independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its ester, and $R^8$ is hydrogen; or $R^8$ is $C_{1-30}$ alkyl; or $R^8$ is a group of the formula —S(=O)$_2$—$R^7$.

Aspect 16. The copolycarbonate optical article of Aspect 15, wherein in the organosulfonic stabilizer each $R^7$ is independently a $C_{6-12}$ aryl, $C_{7-24}$ alkylarylene, or a polymer unit derived from a $C_{2-14}$ ethylenically unsaturated aromatic sulfonic acid or its $C_{1-30}$ alkyl ester; and $R^8$ is hydrogen, $C_{1-24}$ alkyl, or a group of the formula —S(=O)$_2$—$R^7$ wherein $R^7$ is a $C_{6-12}$ aryl or $C_{7-24}$ alkylarylene; and optionally the organosulfonic stabilizer is butyl tosylate.

Aspect 17. The copolycarbonate optical article of any one or more of Aspects 1 to 16, further comprising a macrotexture, a microtexture, a nanotexture, or a combination thereof on a surface of the article.

Aspect 18. The copolycarbonate optical article of any one or more of Aspects 1 to 17, further comprising an indicium or a coating disposed on at least a portion of a surface of the article.

Aspect 19. The copolycarbonate optical article of Aspect 18, wherein the coating is a hard coat, a UV protective coat, an anti-refractive coat, an anti-reflective coat, a scratch resistant coat, a hydrophobic coat, a hydrophilic coat, or a combination thereof, or wherein at least a portion of a surface of the article is metallized.

Aspect 20. The copolycarbonate optical article of any one or more of Aspects 1 to 19, wherein the article is a camera lens, a sensor lens, an illumination lens, a safety glass lens, an ophthalmic corrective lens, or an imaging lens.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like. A "combination thereof" is open and includes any combination comprising at least one of the listed components or properties optionally together with a like or equivalent component or property not listed.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the terms "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "aryl" means an aromatic monovalent group containing only carbon in the aromatic ring or rings; "arylene" means an aromatic divalent group containing only carbon in the aromatic ring or rings; "alkylarylene" means an aryl group that has been substituted with an alkyl group as defined above, with 4-methylphenyl being an exemplary alkylarylene group; "arylalkylene" means an alkyl group that has been substituted with an aryl group as defined above, with benzyl being an exemplary arylalkylene group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Groups that can be present on a substituted position include (—NO$_2$), cyano (—CN), halogen, thiocyano (—SCN), C$_{2-6}$ alkanoyl (e.g., acyl (H$_3$CC (=O)—); carboxamido; C$_{1-6}$ or C$_{1-3}$ alkyl, cycloalkyl, alkenyl, and alkynyl; C$_{1-6}$ or C$_{1-3}$ alkoxy; C$_{6-10}$ aryloxy such as phenoxy; C$_{1-6}$ alkylthio; C$_{1-6}$ or C$_{1-3}$ alkylsulfinyl; C$_{1-6}$ or C$_{1-3}$ alkylsulfonyl; C$_{6-12}$ aryl having at least one aromatic rings (e.g., phenyl, biphenyl, naphthyl, or the like, each ring either substituted or unsubstituted aromatic); C$_{7-19}$ arylalkylene having 1 to 3 separate or fused rings and 6 to 18 ring carbon atoms; or arylalkyleneoxy having 1 to 3 separate or fused rings and 6 to 18 ring carbon atoms. The stated number of carbon atoms includes any substituents.

All references cited herein are incorporated by reference in their entirety. While typical aspects have been set forth for illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A copolycarbonate optical article comprising a polycarbonate composition comprising:
    a copolycarbonate comprising:
        25 to 55 mol % of phthalimidine carbonate units derived from a phthalimidine monomer,
        35 to 75 mol % of high heat carbonate units derived from a high heat bisphenol monomer, and
        0 to 15 mol % of bisphenol A carbonate units derived from a bisphenol A monomer, each based on the sum of the moles of the phthalimidine carbonate units, the high heat carbonate units, and the bisphenol A carbonate units,
    wherein the copolycarbonate comprises
        less than 100 parts per million of each of the phthalimidine monomer, the high heat bisphenol monomer, and the bisphenol A monomer, and
        less than 5 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and
    the copolycarbonate is prepared from the phthalimidine monomer, the high heat bisphenol monomer, and optionally the bisphenol A monomer each having a purity of at least 99.6%, as determined by high performance liquid chromatography; and
    wherein the polycarbonate composition has a glass transition temperature of 200° C. to 260° C. determined by DSC as per ASTM D3418 with a 20° C./min heating rate and a yellowness index of less than 30, measured according to ASTM D1925 on a plaque of 3.2 mm thickness molded at a temperature of 350° C. for a residence time of 2 minutes; and
    wherein the high heat carbonate units have a structure represented by at least one of the following formula:

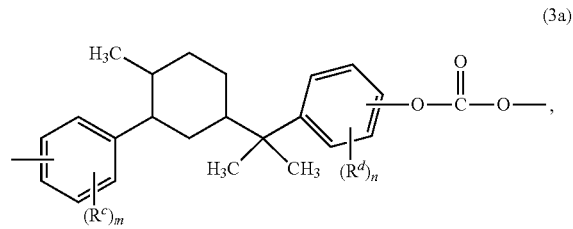

(3a)

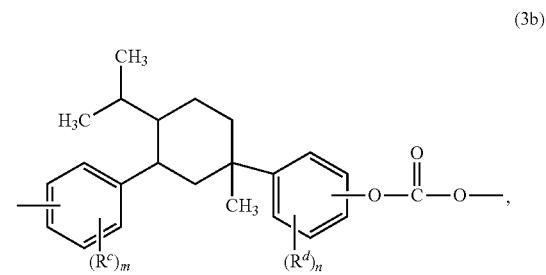

(3b)

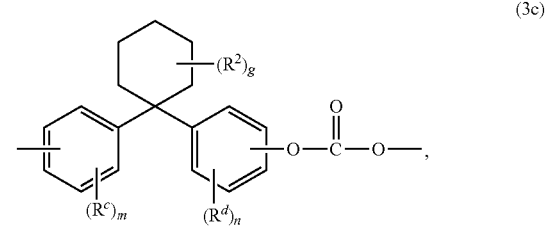

(3c)

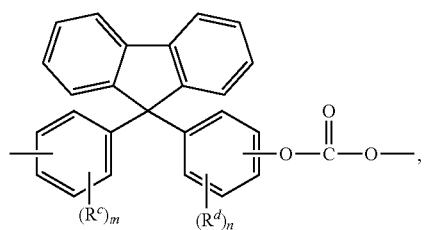
(3e)
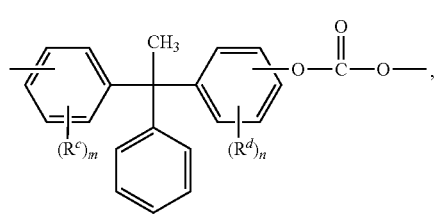
(3f)
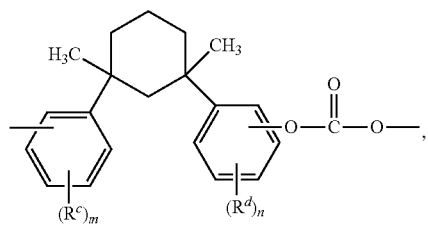
(3g)
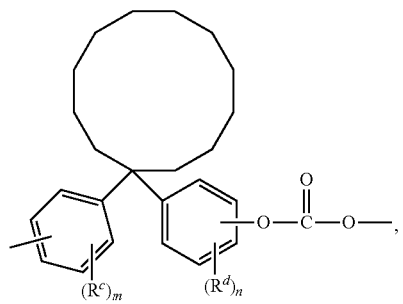
(3h)
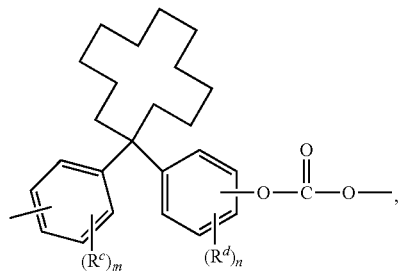
(3i)
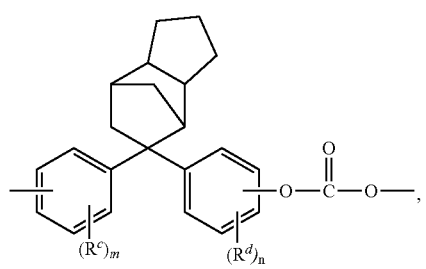
(3j)
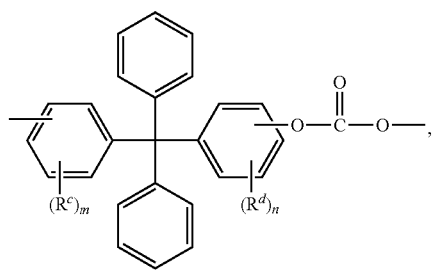
(3k)
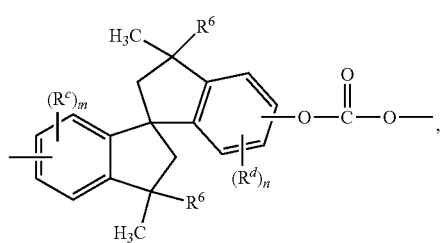
(4)
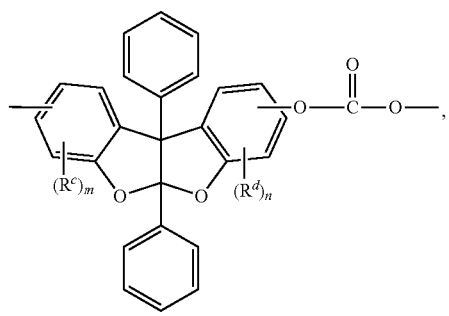
(5)
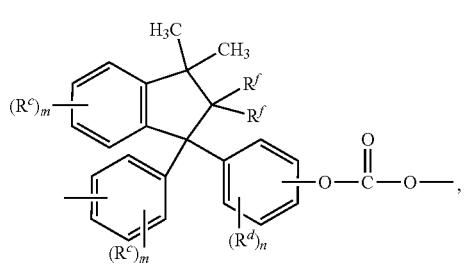
(6)
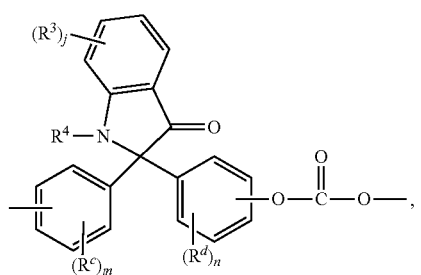
(7)
or
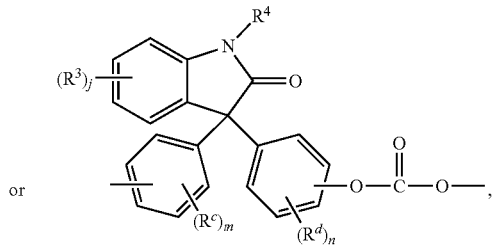
(8)

wherein
R$^c$ and R$^d$ are each independently C$_{1-12}$ alkyl, C$_{2-12}$ alkenyl, C$_{3-8}$ cycloalkyl, or C$_{1-12}$ alkoxy,
each R$^f$ is hydrogen or both R$^f$ together are a carbonyl group,
each R$^2$ is independently C$_{1-6}$ alkyl or hydrogen
each R$^3$ is independently C$_{1-6}$ alkyl,
each R$^4$ is independently hydrogen, C$_{1-6}$ alkyl, or phenyl optionally substituted with 1 to 5 C$_{1-6}$ alkyl groups,
each R$^6$ is independently C$_{1-3}$ alkyl or phenyl,
j, m and n are each independently 0 to 4, and
g is 0 to 10.

2. The copolycarbonate optical article of claim 1, wherein the polycarbonate composition has one or more of the following properties:
an improved hydrolytic stability as compared to a polycarbonate of the same Tg that comprises the same phthalimidine carbonate units and the same bisphenol A carbonate units but no high heat carbonate units;
a haze of less than 5%, and a total transmission greater than 82%, each measured according to ASTM D1003-00 using the color space CIE1931 (Illuminant C and a 2° observer) on a molded plaque with a 3.2 mm thickness; or
a yellow index (YI) less than or equal to 30, as measured by ASTM D1925 on a 3.2 mm plaque.

3. The copolycarbonate optical article of claim 1, wherein the polycarbonate composition has one or more of the following properties:
an improved UV stability as compared to a polycarbonate of the same Tg that comprises the 2-phenyl-3,3'-bis(4-hydroxy phenyl)phthalimidine carbonate units and the same bisphenol A carbonate units but no high heat carbonate units;
a haze of less than 1.5% and a total transmission greater than 84%, each measured according to ASTM D1003-00 using the color space CIE1931 (Illuminant C and a 2° observer) on a molded plaque with a 3.2 mm thickness; or
a yellow index (YI) less than 20 as measured by ASTM D1925 on a 3.2 mm plaque.

4. The copolycarbonate optical article of claim 1, wherein one or more of the phthalimidine monomer, the high heat bisphenol monomer, and the bisphenol A monomer have a purity of equal to or greater than 99.7% and a sulfur level of less than or equal to 2 parts per million as measured by a commercially available Total Sulfur Analysis based on combustion and coulometric detection.

5. The copolycarbonate optical article of claim 1, where the copolycarbonate comprises, based on the sum of the moles of the phthalimidine carbonate units, the high heat carbonate units, and the bisphenol A carbonate units:
25 to 40 mol % of the phthalimidine carbonate units;
55 to 75 mol % of the high heat carbonate units; and
0 to 15 mol % of the bisphenol A carbonate units; and
wherein the copolycarbonate has a glass transition temperature of 245° C. to 260° C., determined by DSC as per ASTM D3418 with a 20° C./min heating rate.

6. The copolycarbonate optical article of claim 1, wherein phthalimidine carbonate units are derived from 2-phenyl-3,3'-bis(4-hydroxy phenyl)phthalimidine.

7. The copolycarbonate optical article of claim 1, wherein the high heat carbonate units have the formula

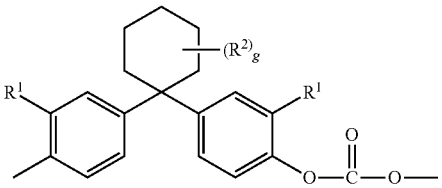

wherein
each R$^1$ is independently hydrogen or C$_{1-4}$ alkyl,
each R$^2$ is independently C$_{1-4}$ alkyl or hydrogen, and
g is 0 to 10.

8. The copolycarbonate optical article of claim 1, wherein the high heat carbonate units are derived from at least one of: 1,1-bis(4-hydroxyphenyl)-3,3,5-trimethyl-cyclohexane, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, or 3,8-dihydroxy-5a,10b-diphenyl-coumarano-2',3',2,3-coumarane.

9. The copolycarbonate optical article of claim 1, wherein the polycarbonate composition further comprises a bisphenol A homopolycarbonate, a copolycarbonate consisting bisphenol A carbonate units and phthalimidine carbonate units, a second copolycarbonate consisting of bisphenol A carbonate units and 1,1-bis(4-hydroxyphenyl)-3,3,5-trimethyl-cyclohexane carbonate units, or a combination thereof.

10. The copolycarbonate optical article of claim 1, wherein the polycarbonate composition further comprises 2 to 40 ppm of an organosulfonic stabilizer of the formula

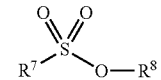

wherein
each R$^7$ is independently a C$_{1-30}$ alkyl, C$_{6-30}$ aryl, C$_{7-30}$ alkylarylene, C$_{7-30}$ arylalkylene, or a polymer unit derived from a C$_{2-32}$ ethylenically unsaturated aromatic sulfonic acid or its ester, and
R$^8$ is hydrogen; or R$^8$ is C$_{1-30}$ alkyl; or R$^8$ is a group of the formula —S(=O)$_2$—R$^7$.

11. The copolycarbonate optical article of claim 10, wherein in the organosulfonic stabilizer each R$^7$ is independently a C$_{6-12}$ aryl, C$_{7-24}$ alkylarylene, or a polymer unit derived from a C$_{2-14}$ ethylenically unsaturated aromatic sulfonic acid or its C$_{1-30}$ alkyl ester; and R$^8$ is hydrogen, C$_{1-24}$ alkyl, or a group of the formula —S(=O)$_2$—R$^7$ wherein R$^7$ is a C$_{6-12}$ aryl or C$_{7-24}$ alkylarylene.

12. The copolycarbonate optical article of claim 1, further comprising a macrotexture, a microtexture, a nanotexture, or a combination thereof on a surface of the article.

13. The copolycarbonate optical article of claim 1, further comprising an indicium or a coating disposed on at least a portion of a surface of the article.

14. The copolycarbonate optical article of claim 13, wherein the coating is a hard coat, a UV protective coat, an anti-refractive coat, an anti-reflective coat, a scratch resistant coat, a hydrophobic coat, a hydrophilic coat, or a combination thereof, or wherein at least a portion of a surface of the article is metallized.

15. The copolycarbonate optical article of claim 1, wherein the article is a camera lens, a sensor lens, an illumination lens, a safety glass lens, an ophthalmic corrective lens, or an imaging lens.

16. The copolycarbonate optical article of claim 1, wherein
$R^3$, $R^6$, $R^c$ and $R^d$ are each independently a $C_{1-4}$ alkyl,
$R^4$ is methyl or phenyl,
j, m and n are each independently 0 or 1, and
g is 0 to 2.

17. A copolycarbonate optical article comprising a polycarbonate composition comprising:
a copolycarbonate comprising:
5 to 45 mol % of phthalimidine carbonate units derived from a phthalimidine monomer;
10 to 75 mol % of high heat carbonate units derived from a high heat bisphenol monomer; and
25 to 55 mol % of the bisphenol A carbonate units derived from a bisphenol A monomer, each based on the sum of the moles of the phthalimidine carbonate units, the high heat carbonate units, and the bisphenol A carbonate units; and
wherein the copolycarbonate comprises
less than 100 parts per million of each of the phthalimidine monomer, the high heat bisphenol monomer, and the bisphenol A monomer, and
less than 5 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and
the copolycarbonate is prepared from the phthalimidine monomer, the high heat bisphenol monomer, and optionally the bisphenol A monomer each having a purity of at least 99.6%, as determined by high performance liquid chromatography; and
wherein the copolycarbonate has a glass transition temperature of 205° C. to 215° C., determined by DSC as per ASTM D3418 with a 20° C./min heating rate and a yellowness index of less than 30, measured according to ASTM D1925 on a plaque of 3.2 mm thickness molded at a temperature of 350° C. for a residence time of 2 minutes.

18. The copolycarbonate optical article of claim 17, claim 1, wherein the high heat carbonate units have the formula:

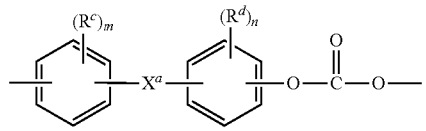

wherein
$R^c$ and $R^d$ are each independently a $C_{1-12}$ alkyl, $C_{2-12}$ alkenyl, $C_{3-8}$ cycloalkyl, or $C_{1-12}$ alkoxy,
each $R^6$ is independently $C_{1-3}$ alkyl or phenyl;
$X^a$ is a $C_{6-12}$ polycyclic aryl, $C_{3-18}$ mono- or polycycloalkylene, $C_{3-18}$ mono- or polycycloalkylidene, -$(Q^1)_x$-G-$(Q^2)_y$- group wherein $Q^1$ and $Q^2$ are each independently a $C_{1-3}$ alkylene, G is a $C_{3-10}$ cycloalkylene, x is 0 or 1, and y is 1, or $C(R^h)(R^g)$— wherein $R^h$ is hydrogen, $C_{1-12}$ alkyl, or $C_{6-12}$ aryl and $R^g$ is $C_{6-10}$ alkyl, $C_{6-8}$ cycloalkyl, or $C_{6-12}$ aryl; and
m and n are each independently 0 to 4.

19. A copolycarbonate optical article of claim 1, comprising a polycarbonate composition comprising:
a copolycarbonate comprising:
2 to 50 mol % of phthalimidine carbonate units derived from a phthalimidine monomer;
5 to 85 mol % of the high heat carbonate units derived from a high heat bisphenol monomer; and
10 to 45 mol % of the bisphenol A carbonate units derived from a bisphenol A monomer, each based on the sum of the moles of the phthalimidine carbonate units, the high heat carbonate units, and the bisphenol A carbonate units; and
wherein the copolycarbonate comprises
less than 100 parts per million of each of the phthalimidine monomer, the high heat bisphenol monomer, and the bisphenol A monomer, and
less than 5 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and
the copolycarbonate is prepared from the phthalimidine monomer, the high heat bisphenol monomer, and optionally the bisphenol A monomer each having a purity of at least 99.6%, as determined by high performance liquid chromatography; and
wherein the copolycarbonate has a glass transition temperature of 215° C. to 225° C., determined by DSC per ASTM D3418 with a 20° C./min heating rate and a yellowness index of less than 30, measured according to ASTM D1925 on a plaque of 3.2 mm thickness molded at a temperature of 350° C. for a residence time of 2 minutes.

20. The A copolycarbonate optical article of claim 1, comprising a polycarbonate composition comprising:
a copolycarbonate comprising:
2 to 55 mol % of phthalimidine carbonate units derived from a phthalimidine monomer;
10 to 90 mol % of the high heat carbonate units derived from a high heat bisphenol monomer; and
5 to 40 mol % of the bisphenol A carbonate units derived from a bisphenol A monomer, each based on the sum of the moles of the phthalimidine carbonate units, the high heat carbonate units, and the bisphenol A carbonate units; and
wherein the copolycarbonate comprises
less than 100 parts per million of each of the phthalimidine monomer, the high heat bisphenol monomer, and the bisphenol A monomer, and
less than 5 ppm by weight of each of an ion of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, and triethylammonium, as measured by ion chromatography; and
the copolycarbonate is prepared from the phthalimidine monomer, the high heat bisphenol monomer, and optionally the bisphenol A monomer each having a purity of at least 99.6%, as determined by high performance liquid chromatography; and
wherein the copolycarbonate has a glass transition temperature of 225° C. to 235° C., determined by DSC per ASTM D3418 with a 20° C./min heating rate and a yellowness index of less than 30, measured according to ASTM D1925 on a plaque of 3.2 mm thickness molded at a temperature of 350° C. for a residence time of 2 minutes.

* * * * *